US008204799B1

(12) United States Patent
Murray et al.

(10) Patent No.: US 8,204,799 B1
(45) Date of Patent: Jun. 19, 2012

(54) SYSTEM AND METHOD FOR COMBINING FULFILLMENT OF CUSTOMER ORDERS FROM MERCHANTS IN COMPUTER-FACILITATED MARKETPLACES

(75) Inventors: Jason Murray, Bellevue, WA (US); Joel Shepherd, Seattle, WA (US); Mark Griffith, Issaquah, WA (US)

(73) Assignee: Amazon Technologies, Inc., Reno, NV (US)

(*) Notice: Subject to any disclaimer, the term of this patent is extended or adjusted under 35 U.S.C. 154(b) by 1320 days.

(21) Appl. No.: 11/852,040

(22) Filed: Sep. 7, 2007

(51) Int. Cl.
*G06Q 30/00* (2012.01)

(52) U.S. Cl. .................................. 705/26.81; 705/27.1

(58) Field of Classification Search ......... 705/26.1–27.2
See application file for complete search history.

(56) References Cited

U.S. PATENT DOCUMENTS

| | | | |
|---|---|---|---|
| 5,715,314 A | 2/1998 | Payne et al. | |
| 5,909,492 A | 6/1999 | Payne et al. | |
| 5,960,411 A | 9/1999 | Hartman et al. | |
| 6,029,141 A | 2/2000 | Bezos et al. | |
| 6,101,482 A | 8/2000 | DiAngelo et al. | |
| 6,223,215 B1 | 4/2001 | Hunt et al. | |
| 6,405,176 B1 | 6/2002 | Toohey | |
| 6,449,599 B1 | 9/2002 | Payne et al. | |
| 6,587,827 B1 | 7/2003 | Hennig et al. | |
| 6,622,127 B1 | 9/2003 | Kiots et al. | |
| 6,725,222 B1 | 4/2004 | Musgrove et al. | |
| 6,845,364 B1 | 1/2005 | Pool et al. | |
| 6,873,968 B2 | 3/2005 | Ehrlich et al. | |
| 7,050,938 B1 | 5/2006 | Prater et al. | |
| 7,222,087 B1 * | 5/2007 | Bezos et al. | 705/26.81 |
| 7,370,009 B1 | 5/2008 | Notani et al. | |
| 7,406,472 B2 | 7/2008 | Manucha et al. | |
| 2002/0038255 A1 * | 3/2002 | Tarvydas et al. | 705/26 |
| 2002/0138496 A1 | 9/2002 | Schambach et al. | |
| 2002/0178074 A1 | 11/2002 | Bloom | |
| 2003/0033205 A1 | 2/2003 | Nowers et al. | |
| 2003/0069831 A1 | 4/2003 | Le et al. | |
| 2003/0083949 A1 | 5/2003 | Kar | |
| 2003/0115072 A1 | 6/2003 | Manucha et al. | |

(Continued)

OTHER PUBLICATIONS

Spiegel and Newport News Join SHOP.COM Business Wire May 22, 2007.*

(Continued)

*Primary Examiner* — Jeffrey A Smith
*Assistant Examiner* — Resha Desai
(74) *Attorney, Agent, or Firm* — Robert C. Kowert; Meyertons, Hood, Kivlin, Kowert & Goetzel, P.C.

(57) ABSTRACT

Combining fulfillment of customer orders from merchants in computer-facilitated marketplaces. An order management system may include a virtual shopping cart interface that may be used with a number of merchants. Each merchant may be registered to receive fulfillment services from a fulfillment services provider for inventory items the merchant offers in commerce. The virtual shopping cart interface may be configured to receive requests to indicate various items within a virtual shopping cart corresponding to a customer. Different inventory items offered by different merchants may be placed within the virtual shopping cart. In response to the customer's request to finalize an order, the order management system may instruct the fulfillment services provider to ship the items in the virtual shopping cart to the customer. A single shipment may include items offered by several different merchants, and each of the merchants may be the merchant of record for its respective inventory item.

30 Claims, 10 Drawing Sheets

U.S. PATENT DOCUMENTS

| | | |
|---|---|---|
| 2003/0171962 A1 | 9/2003 | Hirth et al. |
| 2003/0172007 A1 | 9/2003 | Helmolt et al. |
| 2003/0204447 A1* | 10/2003 | Dalzell et al. ............ 705/26 |
| 2004/0064351 A1 | 4/2004 | Mikurak |
| 2004/0111286 A1 | 6/2004 | Koenig et al. |
| 2004/0117337 A1 | 6/2004 | Beck et al. |
| 2004/0254842 A1 | 12/2004 | Kirkegaard |
| 2005/0006456 A1 | 1/2005 | White |
| 2005/0033671 A1 | 2/2005 | Hahn-Carlson |
| 2005/0081151 A1 | 4/2005 | Van Der Meer |
| 2005/0114222 A1 | 5/2005 | Mundy |
| 2005/0125312 A1 | 6/2005 | Dearing et al. |
| 2005/0154904 A1 | 7/2005 | Perepa et al. |
| 2006/0036504 A1 | 2/2006 | Allocca et al. |
| 2006/0089897 A1 | 4/2006 | Maas et al. |
| 2006/0116936 A1 | 6/2006 | Lucas |
| 2006/0122892 A1 | 6/2006 | Fletcher et al. |
| 2006/0122897 A1 | 6/2006 | Fletcher et al. |
| 2006/0190362 A1 | 8/2006 | Krystek et al. |
| 2006/0195364 A1 | 8/2006 | Shroff et al. |
| 2007/0078725 A1 | 4/2007 | Koszewski et al. |
| 2007/0094510 A1 | 4/2007 | Ross et al. |
| 2007/0143206 A1 | 6/2007 | Cui et al. |

OTHER PUBLICATIONS

International Search Report for PCT/US 07/61620, mailed Nov. 21, 2008.
U.S. Appl. No. 11/958,852, filed Dec. 18, 2007.
U.S. Appl. No. 12/307,707, filed Feb. 26, 2008.
U.S. Appl. No. 11/756,160, filed May 31, 2007.
U.S. Appl. No. 11/751,433, filed May 21, 2007.
Cohen, "Electronic commerce," Information Sciences Institute Research Report ISI/RR-89-244, Oct. 1989, 46 pages.
Amazon Advantage Membership Agreement, Instructions & Rules, Dec. 6, 2004, downloaded from web.archive.org/web/20041211005149/www.amazon.com/exec/obidos/subst/partners/direct/direct-agreement.html, 9 pages.
Amazon Advantage Overview, downloaded from web.archive.org/web/20041024162213/http://www.amazon.com/exec/obidos/subst/partners/direct/advantage/home.html/, 2 pages.
Amazon.com Press Release, "Target and Amazon.com team to advance e-commerce initiatives," Sep. 11, 2001, 2 pages.
Amazon.com Press Release, "Target to deliver four unique brands in one comprehensive site at target.com," Aug. 12, 2002, 2 pages.
U.S. Appl. No. 11/351,881, filed Feb. 10, 2006.

* cited by examiner

| Packing slip 500 | | |
|---|---|---|
| Ship to:<br>John Q. Customer<br>100 Main St.<br>Anytown, USA 12345 | | |
| Contents of this shipment: | | |
| Item | Quantity | Price |
| Item A | 1 | 10.00 |
| Item B<br>    Offered by: Merchant A | 1 | 12.00 |
| Item C<br>    Offered by: Merchant B | 1 | 23.00 |
| Item D<br>    Offered by: Merchant C | 1 | 5.00 |
| | Shipping: | Free |
| | Total: | 50.00 |

*FIG. 5*

SYSTEM AND METHOD FOR COMBINING FULFILLMENT OF CUSTOMER ORDERS FROM MERCHANTS IN COMPUTER-FACILITATED MARKETPLACES

BACKGROUND

Description of the Related Art

In order to offer customers a variety of items readily available for delivery, many merchants (whether engaging in electronic or conventional "brick and mortar" commerce) hold various quantities of such items within inventory facilities. Keeping items in inventory may serve to buffer variations in customer demand or a manufacturer or distributor's ability to supply various items. For example, different items offered for sale by a merchant may have different manufacturer lead times. Holding quantities of such items as inventory may enable a merchant to offer consistent availability of these items to customers despite the different lead times.

However, in some circumstances, holding inventory may present various costs or disadvantages to a merchant. For example, inventory storage facilities may be expensive to provision and maintain, particularly for smaller merchants who may not be able to efficiently and profitably distribute the fixed costs of such facilities across a limited quantity of inventory. Moreover, should the need arise, scaling an inventory system to accommodate increased demand or volume may be an expensive proposition requiring substantial investment in technology, facilities and/or staffing.

A merchant's holding its own inventory may also present disadvantages to customers. As electronic commerce grows in popularity, many merchants increasingly list their offerings along with other merchants via electronic marketplaces that provide a common interface through which customers may search for items and place orders. However, if different merchants are ultimately responsible for fulfilling their own respective orders through such a marketplace, the customer's ordering experience for a given item may vary considerably depending on the merchant from which the item is ordered. For example, a merchant that has little skill or poor processes for order fulfillment may be slow to ship an item, may ship the wrong item, may deliver damaged goods, or may otherwise create a negative customer experience. Such a negative experience may reflect not only on the merchant from which the customer ordered, but also on other merchants in the electronic marketplace, possibly decreasing customer confidence in the marketplace itself.

BRIEF DESCRIPTION OF THE DRAWINGS

FIG. 5 illustrates one embodiment of a packing slip that may be included in a package resulting from the order fulfillment method of FIG. 4.

Figure 1:
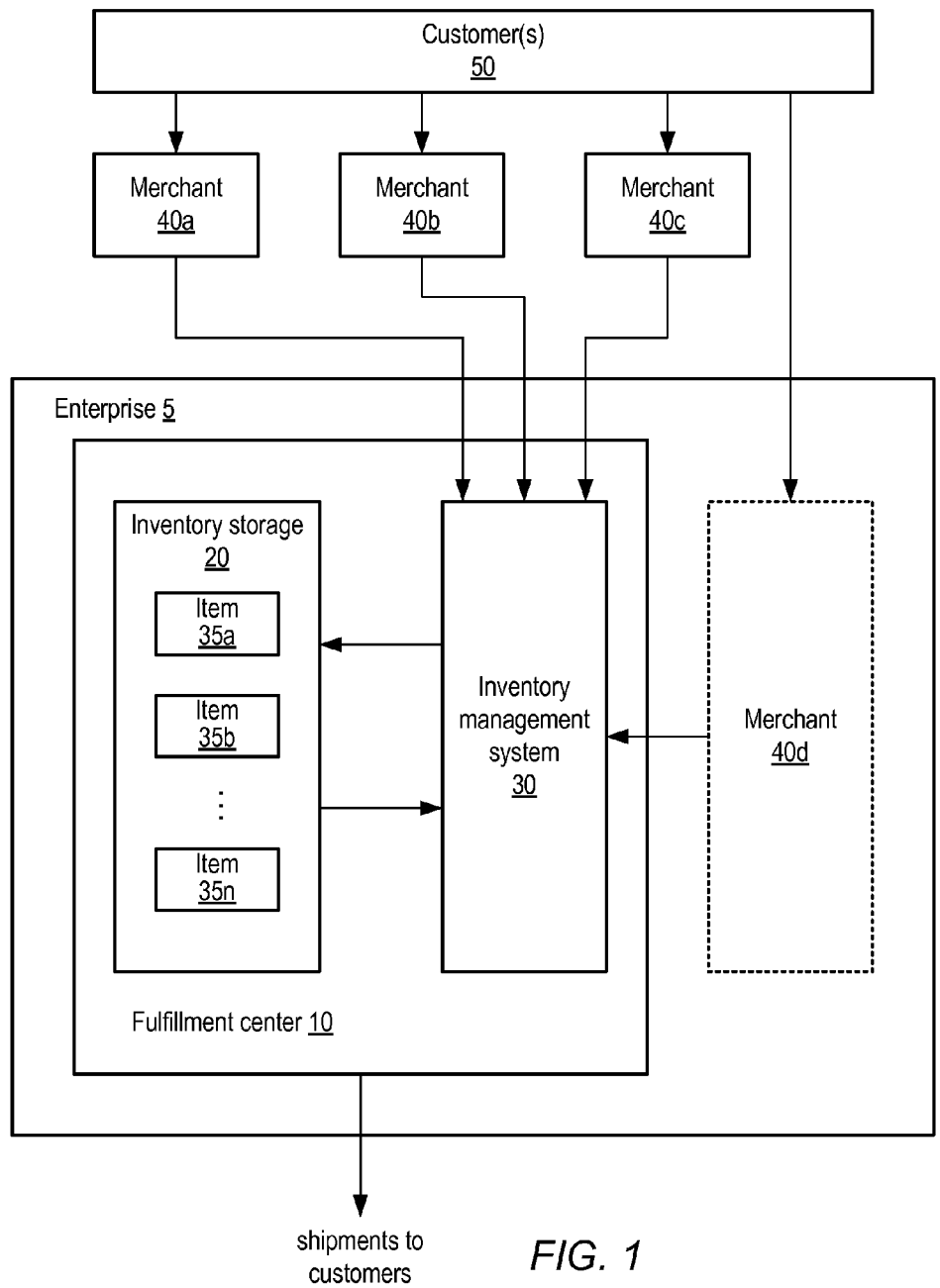
FIG. 1 is a block diagram illustrating one embodiment of a fulfillment center.

While the present disclosure is susceptible to various modifications and alternative forms, specific embodiments thereof are shown by way of example in the drawings and will herein be described in detail. It should be understood, however, that the drawings and detailed description thereto are not intended to limit the claims to the particular form disclosed, but on the contrary, the intention is to cover all modifications, equivalents and alternatives falling within the spirit and scope of the present disclosure as defined by the appended claims.

DETAILED DESCRIPTION OF EMBODIMENTS

Introduction

Numerous aspects of systems configured to implement computer-facilitated marketplaces and order fulfillment are described below. First, aspects of inventory management are described. Techniques for facilitating merchant registration to receive inventory fulfillment services from a fulfillment provider are then discussed. An overview of the fulfillment process is given, and finally, various techniques for integrating the customer shopping experience across various merchants that have arranged to receive inventory fulfillment services are described. It is noted that the order of discussion and section headings are intended to facilitate exposition, are merely exemplary, and are not intended to be limiting.

Fulfillment Center Overview

One embodiment of a fulfillment center configured to store inventory items for customer order fulfillment is illustrated in FIG. 1. In the illustrated embodiment, an enterprise 5 includes a fulfillment center 10 that in turn includes an inventory storage facility 20 as well as an inventory management system 30. Storage facility 20 may be configured to store an arbitrary number of inventory items 35*a-n*. As described on greater detail below, system 30 may be configured to receive customer orders for various ones of items 35 from one or more customers 50 via one or more of an arbitrary number of different merchants 40*a-d*. Additionally, system 30 may be configured to initiate and/or coordinate actions resulting in the shipment of ordered items 35 to corresponding customers 50.

Generally speaking, fulfillment center 10 may be configured to receive and store different kinds of items 35 from various sources, such as wholesalers, distributors, or merchants 40, for example. Items 35 may generally encompass any type of tangible object or substance that may be received for storage. For example and without limitation, items 35 may include media items (e.g., books, compact discs, videotape and/or DVDs), electronic devices, computers and related peripherals and equipment, consumer or commercial appliances, clothing, prescription and/or over-the-counter pharmaceuticals, cosmetics, food, or other suitable items. It is noted that items 35 may be stocked, managed or dispensed in terms of discrete, countable units or multiples of units, such as packages, cartons, crates, pallets or other suitable aggregations. Alternatively, some items 35 such as bulk products, commodities, etc. may be stored in continuous or arbitrarily divisible amounts that may not be inherently organized into countable units. Such items 35 may be managed in terms of measurable quantities such as units of length, area, volume, weight, time duration or other dimensional properties characterized by units of measurement. Generally speaking, a quantity of an item 35 may refer to either a countable number of individual or aggregate units of an item 35 or a measurable amount of an item 35, as appropriate.

Items 35 received at fulfillment center 10 for storage may be stored within inventory storage facility 20, which may include any suitable combination or arrangement of item storage structures. For example, facility 20 may include racks, bins, pallets or other types of storage apparatus arranged in a grid or other fashion. In some embodiments, facility 20 may include different types of storage suitable for items 35 having special storage requirements. For example, certain types of items 35 may be perishable, fragile or volatile and may require storage under controlled temperature, atmospheric or other conditions. Correspondingly, facility 20 may include refrigerated or other types of storage areas configured to satisfy special environmental requirements of certain items 35. It is contemplated that in some embodiments, items 35 may be stored within facility 20 in different configurations than in which they are received. For example, units of items 35 may be received in boxes, on pallets, or in other aggregate units, and may be unpacked or otherwise disaggregated for storage as individual units within bins, on shelves, or in other storage structures within facility 20.

Inventory management system 30 may generally be configured to track and control the status and movement of inventory items 35 through fulfillment center 10. In one embodiment, as described in greater detail below in conjunction with the description of FIG. 6, system 30 may include computer-accessible media configured to store instructions that are executable, e.g. by a processor or computer system, to detect events that relate to items 35 and to generate or initiate actions in response to such events. For example, system 30 may detect events relating to the arrival of inventory items 35 from a supplier or merchant, and may responsively instruct an agent (e.g., a mechanical agent or human agent) to process the received items 35 and store them appropriately within storage facility 20. Similarly, system 30 may be configured to detect orders for various items 35 that may arrive from merchants 40 on behalf of customers 50. Responsively, system 30 may be configured to instruct an agent to select the appropriate item (s) 35 for a received order from storage facility 20 and prepare the selected item(s) 35 for shipping or other conveyance to a corresponding customer 50. In some embodiments, whenever units of a given item 35 are stored within or selected from storage facility 20, system 30 may update an indication corresponding to the given item 35 to reflect its inventory status. For example, such an indication may reflect the number of units currently stored within facility 20, the number of units that have been selected from facility 20 but that have not yet left fulfillment center 10, the number of units of given item 35 that are on order, and/or any other suitable item status information. System 30 may also be configured to process events relating to the processing of damaged or defective items 35, returns received from customers 50, or other exceptional events.

Merchants 40 may arrange to offer various ones of items 35 in commerce to customers 50. Generally speaking, an item 35 may be offered in commerce by a merchant according to any suitable business model. For example, an item 35 may be offered in commerce on the basis of a sale, rental, lease, auction, barter, credit, licensing, royalty or any other type of transaction. Merchants 40 may offer items 35 in commerce through any of a variety of channels. For example, a given merchant 40 may present offers of items 35 via electronic commerce (e-commerce) portals accessible by customers 50. Such e-commerce offerings may variously include listing items 35 via a web-based entity (e.g., a web site or page) hosted by the given merchant 40 and presented as an offering entity distinct from enterprise 5, or listing items 35 via a web-based entity hosted by enterprise 5 on behalf of the given merchant 40. It is noted that in some embodiments, an item 35 may be offered in commerce for promotional or inducement purposes, rather than for immediate consideration or exchange. For example, an item 35 may be offered to a customer 50 without cost but subject to various conditions, such as requiring the customer 50 to utilize the item 35 within a given period of time, provide feedback regarding the item 35, engage in a future transaction with the merchant 40, or other suitable conditions. Alternatively, an item 35 may be offered to a customer 50 without cost or conditions. For example, such an item 35 may be offered to induce customer goodwill, attract customer traffic, or for any other purpose.

In some embodiments, a merchant 40 may list items 35 via a general web-based entity hosted by enterprise 5, such as a marketplace or forum in which many merchants 40 may list offerings. Generally speaking, a marketplace e-commerce channel may generally refer to a web-based entity through which multiple merchants 40 may offer items 35 to customers 50 via one or more web pages. For example, a marketplace may be organized to present to customers 50 one or more web pages listing the various merchants 40 offering a particular item 35 in commerce according to various terms (e.g., price, availability, condition, etc.). Alternatively, a marketplace may be organized to present to customers 50 one or more web pages corresponding to respective virtual storefronts of merchants 40, where each storefront indicates the various offerings of a corresponding merchant 40. In some embodiments, a marketplace may be implemented via a web services application programming interface (API), described below, rather than as one or more web pages. For example, catalog information, ordering functions and other aspects of a marketplace may be implemented as web services functions that may be invoked by various parties to present items 35 in commerce to customers 50. Other configurations of e-commerce marketplaces are possible and contemplated.

A merchant's e-commerce offerings may also include listing items 35 via a third-party web entity distinct from enterprise 5 and the merchant 40, such as a third-party auction web entity. It is also contemplated that a merchant 40 may present e-commerce offerings through entities other than web-based entities. For example, a merchant 40 may present such offerings through electronic mail, electronic bulletin boards, or other electronic channels.

In some embodiments, merchants 40 may also offer items 35 in commerce to customers 50 through non-electronic channels, such as catalog, telephone or physical storefront channels, for example. Alternatively, some merchants 40 may offer items 35 in commerce through a combination of different channels. It is also noted that some merchants, such as merchant 40d, may be affiliated with the enterprise 5 that provides fulfillment services to merchants 40 in general, although in other embodiments, enterprise 5 may provide fulfillment services for items 35 without operating as a merchant for those items.

Generally speaking, customer(s) 50 may include any entity that may place an order for one or more items 35 via one or more merchants 40. For example, a customer 50 may include an individual, institution, corporation, business, organization or other entity. Customers 50 may place orders with merchants 40 via any suitable channel, such as one of the e-commerce channels described above, or via a non-electronic order channel. A customer 50 may be an entity that is ultimately legally and/or fiscally responsible for an order, but need not be such an entity. Similarly, a customer 50 may or may not be the intended recipient of items associated with a given order. For example, a customer 50 may place an order for items 35 on behalf of another entity that may bear liability for payment or may be the intended recipient. In some embodiments, a customer 50 may include multiple individuals or entities that consent to have their ordered items 35 shipped together. For example, a customer 50 may correspond to a group of individuals in the same household or business.

After a given customer 50 places an order for one or more items 35, the order may be fulfilled. Generally speaking, the fulfillment process may include selecting from storage the item(s) 35 specified in the order, packaging selected item(s) 35 appropriately for the mode in which they will be conveyed to the customer 50 or other intended recipient, and conveying the package or packages to the recipient. For example, selected item(s) may be packaged in one or more boxes, envelopes or other types of containers along with protective material, promotional materials (e.g., advertising leaflets or brochures), a packing slip or invoice. The packing container may then be sealed, appropriately labeled, and tendered to a common carrier (e.g., the United States Postal Service or another carrier) or another type of carrier or delivery service for delivery to the intended recipient.

Fulfillment Services Request Processing

As shown in the embodiment of FIG. 1, fulfillment center 10 may be configured to offer fulfillment services to a variety of merchants 40 that may be internal or external to the enterprise associated with fulfillment center 10. In general, fulfillment services may include any actions relating to the storage and processing of items 35 within fulfillment center 10 as well as the fulfillment of specific customer orders for various ones of items 35. For example, fulfillment services may include those tasks involved in receiving items 35 into inventory, such as taking physical receipt of units or quantities of items 35, examining and/or evaluating the condition of received items 35, unpacking or repackaging items 35 if necessary, and storing items 35 within storage facility 20. Fulfillment services may also include selecting or picking items 35 from storage facility 20 in response to a customer order, as well as the packaging and shipping tasks described above. In some embodiments, fulfillment services may include other tasks undertaken on behalf of a merchant 40, such as inspecting or monitoring the quantity and/or condition of items 35 while stored in storage facility 20, receiving and processing items 35 returned from customers 50, processing and disposing of items 35 that are unmarketable for various reasons (e.g., items 35 that are surplus, damaged, expired, spoiled, etc.), engaging in customer service activities (e.g., responding to complaints, inquiries, etc.) with customers 50, or other types of tasks. Embodiments of fulfillment center 10 configured to provide fulfillment services to merchants 40 may also be referred to as fulfillment services providers.

In some instances, fulfillment center 10 may provide fulfillment services to merchants 40 with greater economies of scale than if merchants 40 were to perform their own fulfillment services. For example, the incremental cost of providing a square foot of storage area in a large fulfillment center 10 (e.g., one comprising hundreds of thousands of square feet of storage area) may be significantly lower than the cost incurred by a small merchant 40, which may have limited space for storage or may be forced by local market conditions to retain more space than required for that merchant's inventory. Similarly, fulfillment center 10 may implement sophisticated inventory tracking and management techniques that might be costly and cumbersome to implement on the scale of an individual merchant 40, such as RFID (Radio Frequency Identification) of items, dynamic scheduling and optimization of item selection across multiple orders, real-time inventory tracking with respect to order, receiving and shipping activity, or other inventory management techniques. As described in greater detail below, in some embodiments fulfillment center 10 may be configured to consolidate a single customer's orders from several merchants 40, which may realize additional economies of scale, e.g., by reducing packaging, item handling and shipping costs.

Arranging the provision of fulfillment services to various merchants 40 may present challenges, however. For example, merchants 40 may operate as distinct enterprises having methods and systems for inventory management and accounting that differ from one another as well as from enterprise 5. As a result, merchants 40 and enterprise 5 may lack a uniform way of identifying inventory items 35. For example, a given merchant 40 may identify and manage a particular item 35 by that item's Universal Product Code (UPC), whereas the same item 35 may be identified within fulfillment center 10 by a proprietary unique identification number. Further, merchants 40 may wish to dynamically change the fulfillment services they receive for various items 35. For example, a particular merchant 40 may wish to expeditiously transition from performing its own fulfillment for an item 35 to receiving fulfillment services for that item from fulfillment center 10, or vice versa. If such a transition were to require manual approvals (e.g., of the merchant's eligibility or the item's suitability for fulfillment services) and/or a manual integration of relevant aspects of the particular merchant's inventory and order management systems with those of fulfillment center 10, the overhead of arranging for fulfillment services may significantly erode the savings or efficiencies provided by such services. For example, if enterprise 5 were condition processing of fulfillment services requests on manual lookup and entry of data provided by a merchant 40, days or weeks might elapse In one embodiment, fulfillment center 10 may be configured to provide a registration interface through which a merchant may register to receive fulfillment services for one or more items 35, where operation of the registration interface to process a request for fulfillment services does not require human intervention. For example, the interface may provide an automated process through which a merchant may complete those tasks necessary to initiate fulfillment services for various items 35. As described in greater detail below, in various embodiments such an automated process may include evaluating the credentials of a merchant 40 (e.g., whether the merchant is known to enterprise 5, in good financial status, etc.), assessing the items 35 for which fulfillment services have been requested (e.g., whether the items 35 qualify for the requested services), and providing the requesting merchant 40 with the information needed to complete the fulfillment services request (e.g., providing labels to be applied to items 35 for fulfillment center inventory control, shipping labels for shipping items to a fulfillment center 10, instructions, status reports, or other information). The fulfillment center's portion of each of these tasks may be performed automatically and without human intervention, as detailed below.

Figure 2A:
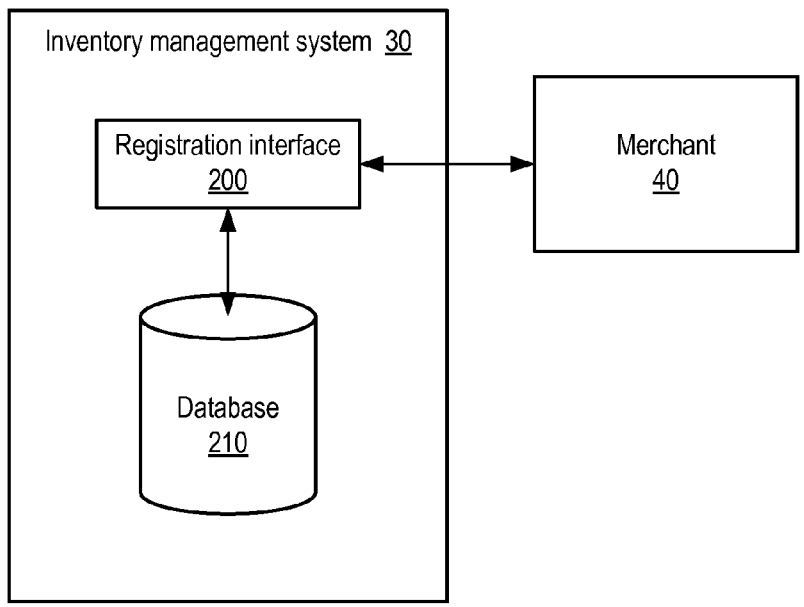
FIG. 2A is a block diagram illustrating one embodiment of a fulfillment services registration interface.

One embodiment of a fulfillment services registration interface is illustrated in FIG. 2A. In the illustrated embodiment, inventory management system 30 of fulfillment center 10 is shown to include a registration interface 200 configured to interact with a database 210. In one embodiment, registration interface 200 may be configured to present an interface through which a given merchant 40 may specify a request for fulfillment services, enter data related to the requested services, and engage in those processing actions deemed necessary by enterprise 5 for given merchant 40 to receive the requested services. For example, in one embodiment interface 200 may be configured to present to a merchant 40 one or more web pages accessible via the public Internet or a private intranet (e.g., a private network maintained by or on behalf of enterprise 5 requiring some level of authentication or secured connection for access). Such a web page may include fillable forms, menus, executable applications (e.g., applications coded in Java™, Javascript or another language suitable for web-based execution) or other web-based interface elements.

In another embodiment, interface 200 may be configured to present a proprietary or non-web-based registration interface to merchants 40. For example, interface 200 may be accessible through a dialup or non-web-based Internet connection, such as via a terminal emulation program such as telnet, or via another type of standard or proprietary application suitable for transmitting information between a merchant 40 and inventory management system 30. In yet another embodiment, interface 200 may include a web services interface for merchant fulfillment services registration, as described in greater detail below. In some embodiments, interface 200 may include other types or modes of interface implementations, including various combinations of the aforementioned techniques, configured for communicating with merchants 40 to perform activities related to registering for or managing use of fulfillment services.

In the illustrated embodiment, interface 200 may be configured to store fulfillment services registration data received from merchants 40, or other data that is derived from or produced as a result of or in relation to a merchant's fulfillment services registration activity, within database 210. Generally speaking, database 210 may include any suitable type of application or data structure that may be configured as a persistent data repository. For example, database 210 may be configured as a relational database that includes one or more tables of columns and rows and that may be searched or queried according to a query language, such as a version of Structured Query Language (SQL). Alternatively, database 210 may be configured as a structured data store that includes data records formatted according to a markup language, such as a version of eXtensible Markup Language (XML). In other embodiments, database 210 may be implemented using one or more arbitrarily or minimally structured data files managed and accessible through any suitable type of application.

Database 210 may generally be configured to store any kind of data related to merchants 40, items 35, and/or requests for fulfillment services in various stages of processing. For example, database 210 may be configured to store identifying information about merchants 40, such as names and address of merchant personnel or departments, merchant billing and shipping address information, merchant banking or other financial information, or other identifying information. Database 210 may also be configured to store current and/or historical status information regarding inventory or sales transactions of merchants 40, such as a merchant's order history, payment history, the status of a merchant's inventory items 35 within fulfillment center 10, the status of any pending fulfillment services requests for a merchant, or other types of status information. In some embodiments, database 210 may also be configured to store identifier mapping information for items 35. For example, database 210 may store records that relate a given merchant 40's identifier for a particular item 35 (e.g., a merchant's stock keeping unit (SKU) identifier) with an identifier that may be specific to enterprise 5 or to fulfillment center 10. Such mapping information may be used, for example, to associate a merchant's fulfillment services request It is noted that database 210 need not be integrated within inventory management system 30, or even within fulfillment center 10. In some embodiments, merchant and/or inventory data may be stored in a number of different data stores distributed throughout enterprise 5. For example, merchant financial data may be stored in an accounting database associated with an accounting department of enterprise 5 that may be distinct from a fulfillment department such as fulfillment center 10. Similarly, in some embodiments interface 200 may be configured to interact with a variety of systems, applications or databases within or external to inventory management system 30 in addition to or instead of database 210.

Figure 3:
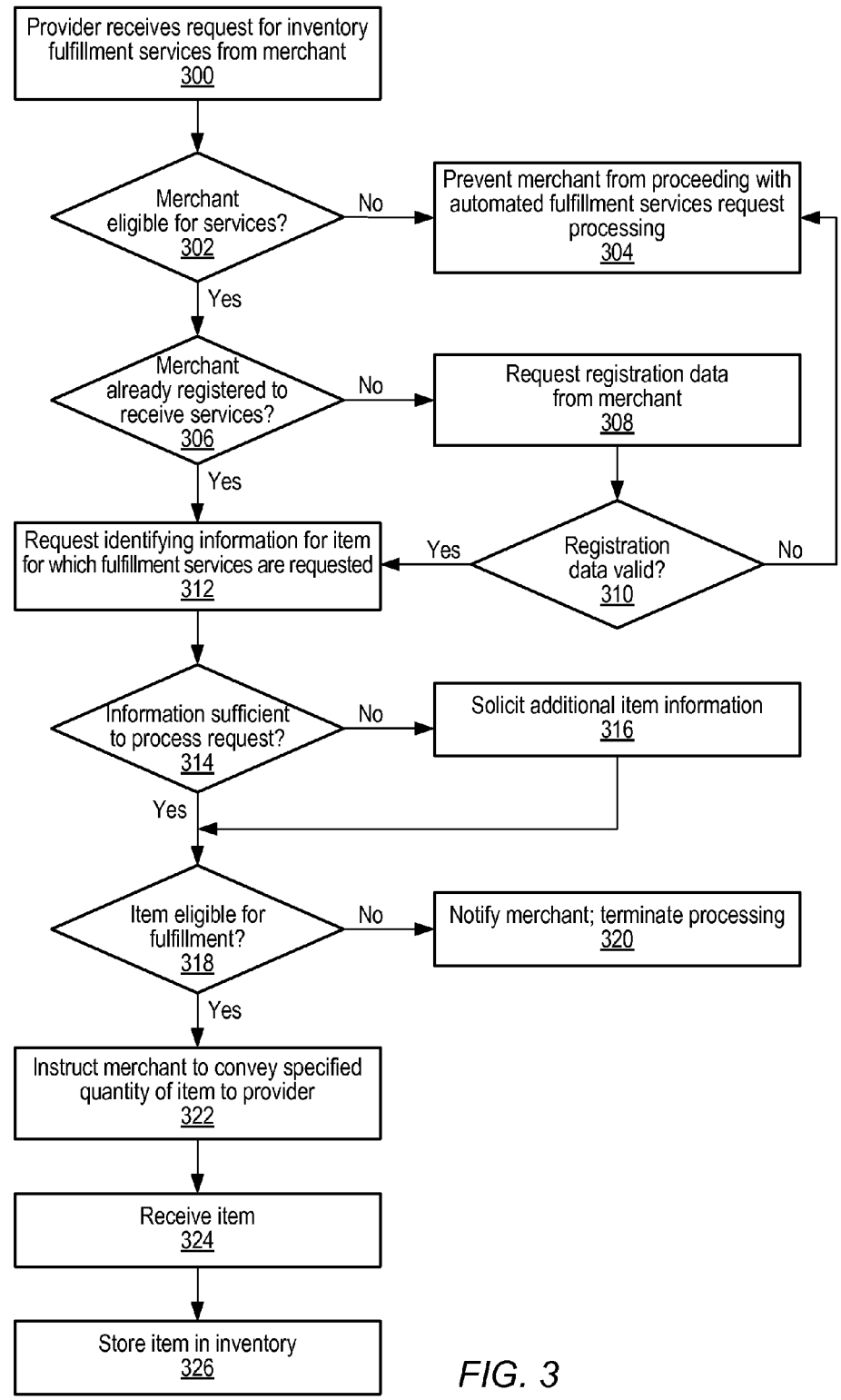
FIG. 3 is a flow diagram illustrating one embodiment of a method through which a fulfillment services provider may receive and process a request for inventory fulfillment services from a merchant.

One embodiment of a method through which a fulfillment services provider (or simply, provider) such as fulfillment center 10 may receive and process a request for inventory fulfillment services from a merchant 40 is illustrated in FIG. 3. It is contemplated that in various embodiments, the illustrated method or a suitable variant thereof may be implemented via computer-executed instructions stored on a computer-accessible medium, as described in greater detail below in conjunction with the description of FIG. 6, or via dedicated computing hardware devices that may be state-dependent (e.g., state machines) but which may not execute discrete instructions per se. It is further contemplated that in some embodiments, some or all of the illustrated method may be implemented by decision logic included within interface 200, while in other embodiments interface 200 may be configured to relay merchant state information (e.g., inputs or outputs of the fulfillment services registration process) to and from other executable components, systems or devices within inventory management system 30 or fulfillment center 10. In such other embodiments, some or all of the illustrated method may be implemented by components other than interface 200. It is noted that in various embodiments, a merchant may submit a single fulfillment services request applicable to multiple different items 35, or may submit respective requests for each of several items 35. Although examples discussed hereinafter may refer to processing of a single item 35, it is understood that the method may be applicable to the concurrent fulfillment services request processing of multiple different items 35.

In the illustrated embodiment, operation begins in block 300 where a request for inventory fulfillment services is received by a fulfillment services provider from a merchant 40. For example, such a request may be received via one embodiment of registration interface 200 as a result of a merchant 40 signing into a secure web page using a merchant identifier and an appropriate credential (e.g., a login name and password, or any other suitable type of credential), and subsequently selecting an option to request fulfillment services (e.g., a link, button, etc.) displayed via the secure web page. In other embodiments, such a request may be received via web services calls or via a mode of communication that does not employ web-based protocols.

Upon receiving a fulfillment services request from a merchant 40, the provider may determine whether the requesting merchant is eligible to receive fulfillment services (block 302). In some embodiments, merchant eligibility for fulfillment services may depend on the merchant's historical behavior. For example, the current status or history of the merchant's prior transactions with the provider or another enterprise may be examined to determine whether the merchant has engaged in fraudulent or questionable transactions with customers, vendors, the provider, or other parties. In some embodiments, a merchant's creditworthiness, customer service history, or any other data related to the merchant (or, in some cases, related to fiscally responsible entities or individuals associated with the merchant, such as guarantors, principals, executives, etc.) may be taken into account when considering a merchant's eligibility for fulfillment services, and such data may include data obtained from third parties such as credit reporting agencies, business references, customers and the like.

In various embodiments, the provider may implement decision models of varying complexity taking into account any of the foregoing types of merchant data or other types not specifically mentioned in order to render a decision as to whether the requesting merchant is eligible for fulfillment services. For example, in one embodiment any history of fraudulent behavior may disqualify a merchant, whereas in other embodiments a more sophisticated risk analysis model may consider such behavior in the context of other data points. It is contemplated that in some embodiments, eligibility for fulfillment services may depend on the type or volume of services requested. For example, a merchant 40 having little history or questionable history may be allowed access to fulfillment services on a trial or probationary basis, with such access restricted to certain types, quantities, or value of items 35, or restricted on some other basis.

If the requesting merchant 40 is determined to be ineligible for fulfillment services, the merchant may be prevented from proceeding with automated fulfillment services request processing (block 304). In some embodiments, the merchant may be directed to contact a fulfillment services agent (e.g., a customer service representative) for further information or assistance in processing the fulfillment services request, for example to receive an explanation of the reasons for disqualification and of actions that may be taken (if any) to remedy the situation.

If the requesting merchant 40 is determined to be eligible for fulfillment services, the provider may determine whether the merchant is already registered to receive fulfillment services (block 306). In one embodiment, determining a merchant's registration status may include determining whether the merchant has supplied data that the provider deems necessary to perform fulfillment services on behalf of the merchant. For example, registration may be contingent upon a merchant 40 agreeing (e.g., electronically or in writing) to a fulfillment services participation agreement that details obligations and expectations of the provider and the merchant relating to fulfillment services (such as the merchant's agreeing to abide by various financial, procedural, customer service or other policies). Registration may also be contingent upon a merchant 40 providing sufficient identifying information, as set forth below. In some embodiments, determining whether a merchant is registered may include determining whether the merchant has previously registered for fulfillment services, and if so, assuming that the merchant is registered without checking each data item required of the merchant for registration. Also, in some embodiments, if the previous registration or any previous fulfillment services activity on behalf of the merchant occurred more than a threshold period of time prior to the current fulfillment services request, the merchant may be required to provide some or all of the registration data once again. It is noted that in some embodiments, determination of a merchant's registration status may occur prior to determination of the merchant's eligibility for fulfillment services.

If the requesting merchant 40 is determined not to be registered, the provider may request registration data from the merchant 40 (block 308). For example, a fillable web form or other request for merchant input may be provided or displayed to the merchant 40 via interface 200. Requested input may include information such as the merchant's name, phone number, address, bank name, bank routing number and account number, taxpayer identification information, and/or any other suitable information. Additionally, if necessary or appropriate, a participation agreement may be conveyed to the merchant 40 via interface 200, along with a solicitation for the merchant to expressly accept or refuse the agreement. The merchant 40 may then enter or supply the requested data in a manner suitable to the mode in which the request was delivered, e.g., by filling out a web-based form.

The provider may then attempt to validate the registration data provided by the merchant 40 (block 310). For example, the provider may check to see that all required data has been provided, and may corroborate certain data items with third parties, e.g., by checking contact or banking information against a public address database or the specified bank, respectively. The provider may also check to see whether the merchant indicated acceptance of the participation agreement, if applicable. If any portion of the provided data fails to validate, the merchant may request that the merchant reenter the data, or may terminate automated fulfillment services request processing and request that the merchant contact an agent for further assistance (block 304).

If the provided data is valid or the merchant 40 is determined to have already registered, the provider may request identifying information associated with the item(s) 35 for which the merchant 40 is requesting fulfillment services (block 312). For example, interface 200 may display another web-based form through which the merchant may provide item-identifying information. In some embodiments, item-identifying information may be supplied along with the initial request for fulfillment services, and a separate request for this information may not be made by the provider. Also, in some embodiments, a merchant 40 may specify a quantity of the item 35 for which fulfillment services are requested in addition to item identifying information.

The provider may then determine whether it has sufficient information about the item 35, as identified by the requesting merchant 40, to process the fulfillment services request for that item (block 314). In one embodiment, the provider may make this determination by first determining whether the item 35 is known to the provider (e.g., whether the provider has some record of information associated with the item 35). For example, as noted previously, an item 35 may be identified by a merchant 40 in a different manner than by fulfillment center 10. In one embodiment, the merchant may provide the merchant's own unique identifier, such as a merchant-specified SKU identifier, as identifying information for an item 35. In response, the provider may determine whether there exists a mapping from the merchant's unique identifier to an identifier known to the provider, for example, by querying database 210 using the merchant's identifier to determine whether a corresponding record includes the provider's identifier. In another embodiment, when supplying identifying information for an item 35, the requesting merchant 40 may provide an identifier known to the provider instead of or in addition to a merchant-specified identifier.

If the provider has insufficient information to process the fulfillment services request for the identified item 35, the provider may solicit additional information from the merchant (block 316). For example, if the provider could not locate a record for item 35 on the basis of a merchant-specific identifier such as a merchant's SKU, the provider may solicit the requesting merchant 40 for a provider-specific identifier, or a generic identifier such as a Universal Product Code identifier, if available. In some embodiments, the provider may provide item search capabilities via interface 200 in order to allow a requesting merchant 40 to determine whether the item 35 for which fulfillment services have been requested is known to the provider. For example, the provider may provide a keyword search feature to allow the requesting merchant 40 to enter keywords relevant to an item 35. Alternatively, the provider may allow the requesting merchant 40 to navigate a hierarchy of item categories to ascertain whether the item 35 identified by the merchant 40 is included in the hierarchy, and in some embodiments, to determine the most similar item in the hierarchy if the item 35 is not included.

In some circumstances, the provider may have no information corresponding to an item 35 for which fulfillment services have been requested. For example, the provider may never have provided fulfillment services for the item 35 before, either for the requesting merchant 40 or any other merchant. In some embodiments, the provider may be configured to request the necessary information in this case. For example, the provider may request that the requesting merchant 40 provide information such as item dimensions, weight, item type or class information (e.g., according to a taxonomy or hierarchy defined by the provider), item special characteristics (e.g., whether the item is liquid, perishable, a hazardous material, requires special handling or storage conditions, etc.) or any other information deemed necessary by the provider to identify the item 35, to determine whether the item 35 is eligible for fulfillment services, and/or to facilitate the provision of fulfillment services.

Once the provider has sufficient information about the identified item 35, the provider may determine whether the item 35 is eligible for the requested fulfillment services (block 318). For example, in one embodiment, the provider may disallow fulfillment services for certain types of items 35, such as hazardous items. In another embodiment, a merchant 40 may be restricted from requesting fulfillment services for certain items 35 according to its participation agreement or fee structure, current business relationship with the provider, the current state of the merchant's other inventory with respect to the provider, or any other suitable criterion. For example, a merchant 40 may contract with a provider to receive fulfillment services for a certain quantity of an item 35 over a given period of time, such that fulfillment requests for additional quantities of that item 35 may be disallowed.

If the fulfillment services request cannot be processed owing to ineligibility of the item 35, the provider may notify the requesting merchant 40 via interface 200, and automated fulfillment services request processing may terminate (block 320). Otherwise, the provider may instruct the requesting merchant 40 to convey some specified quantity of item 35 to the provider, such as a quantity that may have been specified by the requesting merchant in or subsequent to the request for fulfillment services (block 322).

In one embodiment, in instructing the merchant to convey item 35, the provider may provide the requesting merchant 40 with data to be used by the merchant to identify individual units of item 35. For example, the provider may convey a document file to the merchant via interface 200, such as a Portable Document Format (PDF) file or another type of document file, which includes alphanumeric, bar code or other information indicative of identifying information that may be used to manage units of the item 35 within fulfillment center 10. In various embodiments, such identifying information may uniquely identify each individual unit of the item 35, may generically identify the units as being identical instances of the kind or type of item 35, or may combine information generic to the item 35 with information specific to a particular unit of the item 35. For example, the provided identifying information may include a serial number that is unique to a particular unit of an item 35, a UPC or similar product code that is generic to all units of an item 35, or a code that identifies the product type of item 35 as well as the condition of a particular unit (e.g., new, used, damaged, etc.). Any suitable type or combination of identifying information may be employed. The provided document may be used to generate labels to be respectively affixed to individual units of item 35. For example, the requesting merchant 40 may, upon receiving the document, print its contents on label stock and affix the labels to units of item 35 as appropriate.

The provider may also provide the requesting merchant 40 with data to be used by the merchant to convey item 35 to the provider. In one embodiment, the provider may convey a document file, such as a PDF document or other type of document file, to the merchant via interface 200 that includes data indicative of shipping information. For example, the document file may include address information, bar code data and/or other data that may be used to generate a shipping label. Such a shipping label may be a generic shipping label suitable for tendering a package to any type of carrier. Alternatively, the shipping label data may be tailored to a particular carrier, for example by including bar code, geographic code, or other routing or handling information specific to the particular carrier. In some embodiments, shipping information data may be included in the same document used to convey unit identifying information as described above, while in other embodiments shipping information data may be conveyed in a separate document. It is noted that in various embodiments, the provider may convey unit-identifying information, shipping information, both or neither to the requesting merchant 40.

In some embodiments, shipping-related data provided to the requesting merchant 40 may reflect the number of discrete shipments or packages expected from the requesting merchant 40. For example, the merchant may indicate that the specified quantity of item 35 for which fulfillment services have been requested may be divided among a certain number of packages. Alternatively, the provider may instruct the requesting merchant 40 to divide the specified quantity among shipments in a particular way. In some embodiments, the shipping data provided to the requesting merchant 40 in the case of multiple shipments or packages of a particular item 35 may uniquely identify each shipment or package, for example by including bar code or other information to be included on shipping labels generated from the shipping data. It is contemplated that in some embodiments, the provider may instruct the requesting merchant 40 to ship different quantities of item 35 to different fulfillment centers 10, and shipping data conveyed to the requesting merchant 40 may reflect this distribution. For example, the provider may specify the distribution according to available storage resources at various fulfillment centers 10. Alternatively, the provider or the requesting merchant 40 may wish to ensure a particular geographical distribution of item 35 among different fulfillment centers 10, for example to satisfy expected patterns of demand.

In many cases, upon receiving instructions to convey the specified quantity of item 35 to the provider, the requesting merchant 40 may appropriately package and ship item 35 to the provider according to the received instructions. For example, the requesting merchant 40 may print item labels and affix them to units of item 35, pack the units in one or more packages for shipment, print shipping labels and affix them to the package(s), and tender the package(s) to a shipper or carrier for shipment to the provider. However, the requesting merchant 40 need not be in actual possession of item 35. In some embodiments, the requesting merchant 40 may arrange with a third party, such as a manufacturer, distributor, vendor, or other type of supplier, to convey the specified quantity of item 35 to the provider. For example, the requesting merchant 40 may forward item identifying and/or shipping information to the third party, which may arrange to convey item 35 to the provider on behalf of the requesting merchant 40.

Subsequent to instructing the requesting merchant 40 to convey the specified quantity of item 35, the provider may receive item 35 (block 324) and store item 35 into inventory (block 326). For example, one or more packages including units of item 35 may arrive at fulfillment center 10. In various embodiments, the package(s) may be scanned, unpacked, inspected, and/or otherwise processed, and units of item 35 may be stored within storage facility 20. Inventory management system 30 may also be appropriately updated to reflect the status of received units of item 35, and in some embodiments the requesting merchant 40 may be notified that item 35 is available for fulfillment.

In some embodiments, the provider may receive a notification of shipment from the requesting merchant 40 before item 35 arrives. In some such embodiments, either the provider or the requesting merchant 40 may update an indication of availability of item 35 in response to such a notification. For example, the requesting merchant 40 may offer item 35 in commerce via an e-commerce channel maintained by enterprise 5, such as a web-based storefront or a marketplace. In response to a notification of shipment received from the requesting merchant 40, enterprise 5 may update an offering display or listing of item 35 to indicate an expected lead time or other indication of availability, taking into account factors such as expected time in transit from the requesting merchant 40 to the provider, processing time to receive and store item 35 at the provider, and/or other factors affecting availability of item 35.

It is noted that in some embodiments, a fulfillment services provider such as fulfillment center 10 may operate to allow a merchant 40 to request fulfillment services for an item 35, to conduct those actions necessary to validate the eligibility of the merchant and the item for the requested services, and to convey to the merchant the data necessary for the merchant to prepare item 35 for the requested services and convey item 35 to the provider. In particular, it is noted that fulfillment center 10 may perform these tasks in an entirely automated manner, such that if the requesting merchant 40 and the item 35 satisfy the provider's eligibility requirements, the fulfillment services request may be processed without human intervention. For example, by interacting with fulfillment center 10 via registration interface 200, a merchant 40 may complete a fulfillment services request for an item 35, ship item 35 to fulfillment center 10, and begin relaying customer orders for item 35 to fulfillment center 10 for fulfillment as detailed below, without depending on the actions of an agent of fulfillment center 10 external to registration interface 200. Such an automated fulfillment services request processing system may also be referred to as a "self-service" system, in that a merchant 40 may interact with the system entirely on its own initiative.

Figure 2B:
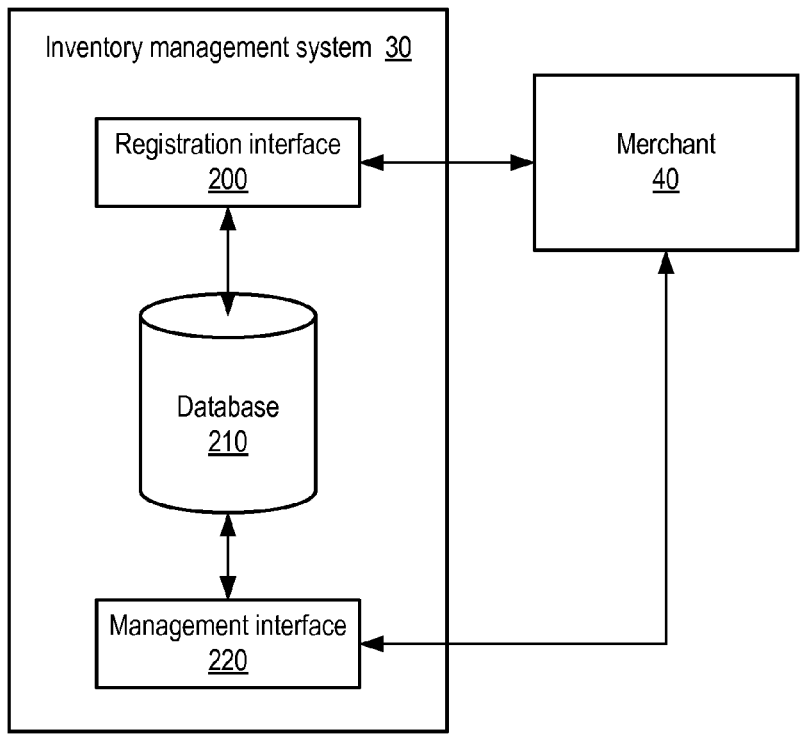
FIG. 2B is a block diagram illustrating one embodiment of a fulfillment services management interface.

In one embodiment, in addition to providing a self-service registration interface 200 through which merchants 40 may request inventory fulfillment services for various items 35, a fulfillment services provider may provide a management interface through which merchants 40 may manage various aspects of the fulfillment services applicable to their items 35. FIG. 2B illustrates an embodiment of inventory management system 30 similar to that of FIG. 2A, with the addition of a management interface 220 that may be configured to interact with database 210 as well as merchant 40.

Management interface 220 may be configured to present an interface through which a given merchant 40 may perform any of a variety of functions, described below, with respect to items 35 for which the given merchant may have previously requested fulfillment services (e.g., via registration interface 200). Like registration interface 200, in one embodiment management interface 220 may be configured to present to a merchant 40 one or more web pages accessible via the public Internet or a private intranet (e.g., a private network maintained by or on behalf of enterprise 5 requiring some level of authentication or secured connection for access). Such a web page may include fillable forms, menus, executable applications (e.g., applications coded in Java™, Javascript or another language suitable for web-based execution) or other web-based interface elements. In other embodiments, management interface 220 may be configured to present a non-web-based management interface or a web services-based management interface to merchants 40, in a manner similar to that described above with respect to registration interface 200.

In some embodiments, it is contemplated that both registration interface 200 and management interface 220 may be implemented as distinct or integrated portions of a web-based fulfillment services portal. For example, functionality associated with both registration interface 200 and management interface 220 may be implemented via respective web pages or groups of web pages presented to merchants 40 as aspects of a centralized fulfillment services website. Alternatively, such functionality may be presented through respective sets of web services calls presented to merchants 40 as a general web services API for registration for and management of fulfillment services.

As described above, in one embodiment, after a merchant 40 has registered an item 35 for fulfillment services, the item 35 may be placed under the physical custody and management of fulfillment center 10. In such an embodiment, the supply chain for items 35 may be extended to encompass items 35 in transit from the merchant 40 to fulfillment center 10 and from fulfillment center 10 to customers 50 in addition to the status of items 35 within fulfillment center 10. (In some cases, the general supply chain for an item 35 may also account for the reverse supply chain reflecting the flow of returned units from customers 50 and/or units removed from fulfillment center 10 and conveyed back to a merchant 40.) In some embodiments, management interface 220 may be configured to provide a given merchant 40 with visibility into the status of the general supply chain with respect to its registered items 35. For example, management interface 220 may provide an indication or display of the quantity of units of a given item 35 that are in transit between given merchant 40, fulfillment center 10 and/or customers 50 at any given time (e.g., including tracking information for units in transit, if available or applicable).

In one embodiment, management interface 220 may also provide an indication of the status of units of given item 35 held in inventory within fulfillment center 10, such as identifying units committed to orders but not yet picked or shipped, identifying units that are spoiled or damaged, or identifying any other relevant inventory status information. In some embodiments, management interface 220 may provide to a merchant 40 explanatory information regarding problems or exceptions that arise in the supply chain for an item 35. For example, if units of an item 35 were damaged upon arrival at fulfillment center 10 from merchant 40, or were otherwise in a state or condition different from that expected from or indicated by merchant 40 when fulfillment services were requested for the units (e.g., used rather than new condition), management interface 220 may be configured to display such information to merchant 40 and allow the merchant 40 to specify an action to resolve the problem. For example, management interface 220 may allow the merchant 40 to instruct that damaged items be disposed of or returned to the merchant 40, to allow the merchant 40 to arrange to convey additional units to fulfillment center 10 (e.g., to cover outstanding orders), or to take another suitable action. More generally, management interface 220 may allow merchant 40 to request, on its own initiative, that units of an item 35 be withdrawn from inventory (e.g., for return to merchant 40), repositioned among different fulfillment centers 10, or disposed of.

Generally speaking, management interface 220 may be configured to provide any type of function suitable for monitoring or altering the status of a given item 35 within the extended supply chain encompassing a merchant 40, fulfillment center 10 and customers 50. In some embodiments, the supply chain and management interface functionality may be extended to other third parties such as manufacturers, distributors, wholesalers, or other parties that may be involved in transactions pertaining to given item 35.

In other embodiments, management interface 220 may be configured to provide functions that may not be directly related to supply chain monitoring or management. In one embodiment, management interface 220 may be configured to provide an interface through which a merchant 40 may receive notice of customer service issues raised on behalf of customers 50 and to participate in their resolution. For example, inventory management system 30 may be configured to receive reports of customer service issues raised with respect to particular orders and to identify the merchant(s) 40 associated with those orders (or specific items 35 included in the orders). System 30 may then direct such customer service reports associated with a given merchant 40 to an inbox, forum or other repository accessible by the given merchant 40 via management interface 220. Alternatively, management interface 220 may forward such reports directly to the given merchant 40, for example via email. In response to a given report, the given merchant 40 may participate in resolving the issue via management interface 220, for example by arranging for an item 35 to be returned or replaced, arranging for a refund or credit to be issued to a customer 50, or indicating another suitable action.

Order Fulfillment Process

As mentioned previously, a fulfillment services provider such as fulfillment center 10 of enterprise 5 may perform fulfillment services for a variety of items 35 offered in commerce by a number of different merchants 40. A merchant 40 may request such services via a self-service registration interface, as described above with respect to FIG. 3.

Once a merchant 40 has arranged to receive fulfillment services for an item 35 from a provider, the provider may proceed to fulfill customer orders. In one embodiment, a customer may place an order for an item 35 directly with a merchant 40 via a channel through which the merchant 40 offers the item 35 in commerce (e.g., through e-commerce or other types of channels as described above). In one such embodiment, customer orders may be conveyed to fulfillment center 10 from a merchant 40 via inventory management system 30, either via interface 200 or via a different interface configured for order processing. In other embodiments, customer orders may be conveyed to fulfillment center 10 through a third party. For example, a merchant 40 may present its own order-entry interface to customers 50 and assume responsibility for conveying the order to fulfillment center 10 for fulfillment. Alternatively, a merchant 40 may arrange for enterprise 5 to host a commerce channel including an order-entry interface on behalf of the merchant, such that the merchant 40 may not be directly involved in receiving and processing the order, but may be fiscally and/or legally responsible for the order.

In some circumstances, a given customer 50 may place an order for two or more different items 35 offered in commerce by different respective merchants 40. For example, the given customer 50 may place separate orders with each one of the merchants 40, ordering a first item 35 or group of items 35 from a first merchant 40, a second item 35 or group of items 35 from a second merchant 40, and so on, in any suitable combination. Alternatively, the given customer 50 may place one or more orders via an e-commerce channel that allows the given customer 50 to concurrently view the offerings of more than one merchant 40. For example, as described in greater detail below, the given customer 50 may use a virtual "shopping cart" into which items 35 offered by different merchants 40 can be placed for order processing. Such a shopping cart may allow the given customer's item selections for a particular order to persist across different e-commerce channels. For example, the contents of a customer's shopping cart may persist as the customer browses from one merchant's web site or listing page to a channel associated with another merchant 40. In some embodiments, a virtual shopping cart may simplify the customer's ordering experience, for example by allowing a customer 50 to submit one payment transaction for all items 35 in the cart rather than submitting separate payment transactions for each merchant 40 associated with those items. A virtual shopping cart may also facilitate identification of opportunities to consolidate items 35 ordered from multiple different merchants 40 by a given customer 50, as described in greater detail below.

In a conventional model of order fulfillment, items 35 ordered from different merchants 40 would be fulfilled separately, which may increase overall costs of fulfillment. For example, packaging and shipping a group of items 35 separately may cost more than packaging and shipping those items together. However, in some embodiments, a fulfillment services provider such as fulfillment center 10 may be configured to consolidate items 35 ordered by a single customer 50 from multiple merchants 40 such that at least some items 35 ordered from different merchants 40 are packaged and shipped as a single shipment, while each merchant 40 remains the merchant of record for its respective item 35. In shipping certain items 35 together, costs of fulfillment may be reduced and the resulting savings passed along to the customer 50 or retained as profit by merchants 40 and/or enterprise 5. At the same time, each merchant 40 may remain the merchant of record for items 35 it offers in commerce, retaining the fiscal, legal and/or other obligations and benefits associated therewith. That is, although the fulfillment services provider may have physical custody of items 35 for which it provides fulfillment services on behalf of merchants 40, the provider may simply function as an intermediary, rather than a principal, in transactions between merchants 40 and customers 50. In various embodiments, the role of the provider in fulfilling an order may or may not be visible to a customer 50.

Figure 4:
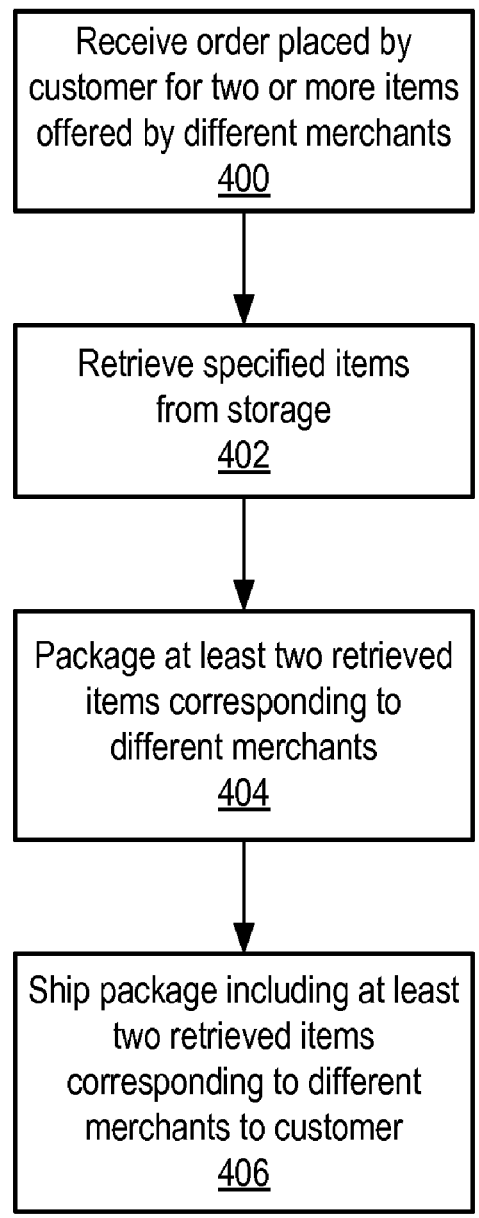
FIG. 4 is a flow diagram illustrating one embodiment of a method of fulfilling orders for items on behalf of a number of merchants.

One embodiment of a method of fulfilling orders for items 35 on behalf of a number of different merchants 40 is illustrated in FIG. 4. Referring collectively to FIGS. 1-4, operation begins in block 400 where a fulfillment services provider such as fulfillment center 10 receives one or more orders placed by a customer 50 for at least two different items 35 offered in commerce by different respective merchants 40. In some embodiments, one or more of the merchants 40 may have requested fulfillment services for its corresponding ordered item 35 via a self-services fulfillment services interface, such as interface 200, as described above with respect to FIG. 3. As described previously, the order(s) may be received from merchants 40, directly from the customer 50, or via a third party. In embodiments where a virtual shopping cart is employed, the relationship among the different items 35, the different merchants 40 and the ordering customer 50 may be explicit or implicit in the data records generated as a result of processing the virtual shopping cart contents. For example, the virtual shopping cart may assign a common order identifier to each item 35 that forms a component of the customer's order, which may facilitate the provider's combining of items 35 into shipments as described below.

In some embodiments, if multiple distinct orders are received from a single customer 50, either from the same or different merchants 40, the orders may be linked by the provider, for example on the basis of a common customer identifier or a common order identifier that may be coordinated among merchants 40 and the provider. Once identified as linked or related, the multiple orders may be processed as a single order for the fulfillment processes described below, to the extent possible. In some such embodiments, the provider may only link orders that are placed or received within a given interval of time, such as orders placed within one hour, one day, etc. The interval may depend on the mode of delivery specified by the customer. For example, if a customer 50 requests expedited shipping for a given order, the interval of time for linking the given order to other orders may be relatively short to prevent delay in shipping the given order.

Subsequent to receiving the order(s), the specified items 35 may be retrieved from storage (block 402). For example, in one embodiment, customer orders may be processed by inventory management system 30 to generate instructions for a human or mechanical picker to select the specified items 35 from within inventory storage facility 20. It is contemplated that in some embodiments, the specified items 35 may be retrieved along with other items 35 destined for unrelated orders. For example, system 30 may divide a number of orders up among multiple pickers in order to optimize picker efficiency, particularly in instances where the items 35 specified in a given order are widely distributed throughout fulfillment center 10.

At least two of the retrieved items 35 corresponding to two different merchants 40 may then be packaged (block 404). For example, the retrieved items 35 may be delivered to a packaging area within fulfillment center 10 to be appropriately packaged for shipment, which may include selection of appropriate boxes or other enclosures, insertion of protective packing materials, and/or inclusion of a packing slip, invoice, manifest, promotional materials or other materials. In some embodiments, if all items 35 corresponding to the customer's order(s) are present in the fulfillment center 10, they may be packaged as a single package for shipment, or divided among multiple packages if cost, item characteristics or shipper requirements dictate. In some cases, fulfillment of ordered items 35 may be distributed across different fulfillment centers 10, for example depending on item availability.

Subsequently, a package including at least two items 35 corresponding to two different merchants 40 may be shipped to the customer 50 (block 406). For example, the package or packages may be tendered to a common carrier for shipping.

One embodiment of a packing slip that may be included in a package fulfilled according to the method of FIG. 4 is shown in FIG. 5. In the illustrated embodiment, packing slip 500 indicates that four items 35 are included within a shipment to the identified customer. Items A and B are indicated as having been offered by Merchant A. Item C is indicated as having been offered by Merchant B. Item D is indicated as having been offered by Merchant C. Thus, Merchants A-C are indicated as the merchants of record for their corresponding items A-D, yet the identified customer may receive items A-D as a single shipment. Other situations involving different numbers of items and merchants are possible and contemplated. It is noted that various embodiments, packing slip 500 may correspond to a customer invoice, billing document, bill of lading, or other document formatted to summarize order information.

It is further noted that in some embodiments, packing slip 500 may include multiple pages or components formatted in a variety of ways. For example, items 35 corresponding to different merchants of record may be indicated on different pages or sections of packing slip 500. In some cases, packing slip 500 may also include information or data in addition to information identifying merchants of record. For example, such information may include terms and conditions that may apply to a given item 35 or a transaction involving given item 35 with respect to the merchant of record, warranty information, customer service information (e.g., contact information for complaints, returns, exchanges, etc.), marketing or promotional information (e.g., offers of future discounts, coupons, etc.), or other types of information. In some embodiments, the information included by packing slip 500 may be customized or formatted to suit requirements or customs pertinent to the location of a customer. For example, different documentation requirements may apply to transactions involving customers located in different legal jurisdictions (e.g., states, countries, etc.). Packing slip 500 may be appropriately formatted to take such requirements or other factors into account.

Consolidation of items 35 ordered from multiple merchants into fewer shipments may result in lower fulfillment costs, as noted above. For example, by virtue of volume, fulfillment center 10 may have preferential access to discounted shipping rates relative to those available to individual merchants 40. Thus, by allowing its items 35 to be combined for shipment with items 35 from another merchant 40, a given merchant 40 may enjoy lower costs of shipping and packaging. Moreover, customer goodwill may be increased through more a timely and/or convenient shopping experience. For example, a customer's order may be completed more quickly through fulfillment from fulfillment center 10 than if each merchant 40 involved in the order fulfilled its portion separately. Moreover, in addition to the possibility of reduced shipping costs to the customer 50, fewer shipments may reduce customer inconvenience in taking delivery of items 35, for example if the customer or the customer's agent must be present at the time of delivery.

It is noted that while order consolidation as described above may be sufficient to reduce fulfillment costs, such consolidation may not be necessary to do so. In some circumstances, the cost of fulfilling a single item 35 through fulfillment center 10 may be lower than if a merchant 40 were to perform its own fulfillment. For example, fulfillment center 10 may benefit from greater economies of scale, better infrastructure for inventory and supply chain management, or other advantages that result in reduced fulfillment costs relative to a merchant 40 performing its own fulfillment on a smaller scale.

In some instances, a merchant's registration of a given item 35 for fulfillment services via registration interface 200 may render that item 35 eligible for various services or promotional opportunities available to items 35 fulfilled by fulfillment center 10, such as a reduced-cost or expedited shipping promotion in which the customer may receive free standard shipping, free expedited shipping, reduced-cost standard or expedited shipping, etc. Other promotional opportunities may include discounts against a current order, credits against future orders, loyalty program points, discounts or credits with partner merchants, or other types of promotions. Such eligibility may apply even to instances in which a customer 50 orders a single unit of the given item 35 without combining the given item 35 with other items 35 in the order. For example, in one embodiment the eligibility for a promotional shipping arrangement or other promotional opportunity of items 35 fulfilled by fulfillment center 10 may depend on the total price of a customer's order. In such an embodiment, if the given item 35 has a price sufficient to meet the eligibility criterion, the customer 50 may receive promotional consideration upon ordering a single unit of the given item 35, alone or in combination with other items 35 fulfilled by fulfillment center 10.

In some embodiments, the cost savings resulting from a merchant's self-service registration for fulfillment services as described above and/or the cost savings resulting from efficiencies of fulfillment center 10 may be used to fund promotional opportunities offered to customers, such as opportunities to receive reduced-cost or expedited shipping, item discounts, or other types of promotions. In other cases, such cost savings may be offered to merchants 40 as a discount or credit against charges for fulfillment services, as profit sharing or cooperative marketing funding, or in another suitable fashion. Such savings may also be retained by enterprise 5 or distributed among enterprise 5, merchants 40 and/or customers 50 in any combination of the foregoing ways.

As described previously, various aspects of the methods and techniques described above (e.g., various aspects of registration interface 200 and/or management interface 220) may be presented to merchants 40 or customers 50 through the use of web pages. Generally speaking, a web page may include data content as well as metadata content that may be configured to control the presentation of the data content. For example, a web page may include text, still images, video content, navigable links, or other types of data content, as well as metadata or instructions that may control the placement, appearance, interactive behavior, or other presentation aspects of the data content.

Often, the data and metadata contents of a web page may be coded in a language, such as a version of Hypertext Markup Language (HTML) or any other suitable language for web-based content implementation. Web page contents may be conveyed from a content source, such as a web host implemented by or on behalf of fulfillment center 10 or enterprise 5, to a client, such as a merchant 40 or a customer 50, over a network (e.g., the Internet or a private network) using a suitable transport protocol such as a version of Hypertext Transport Protocol (HTTP), for example. The contents may then be interpreted or processed, as indicated by the coding language and metadata content, by a suitable client application such as a web browser. Some exemplary types of web browsers include, but are not limited to, Microsoft Internet Explorer™, Mozilla Firefox, and Opera™. In addition to presenting the web page to a client, the web browser may also collect and process input data from the client. For example, the browser may detect the selection or activation of navigable links, menu items, buttons, or other types of input devices that may be presented to a client, and may operate in response to such selection or activation by conveying data back to the content source or another entity or system, navigating to a different content source, or performing another suitable action.

Figure 6:
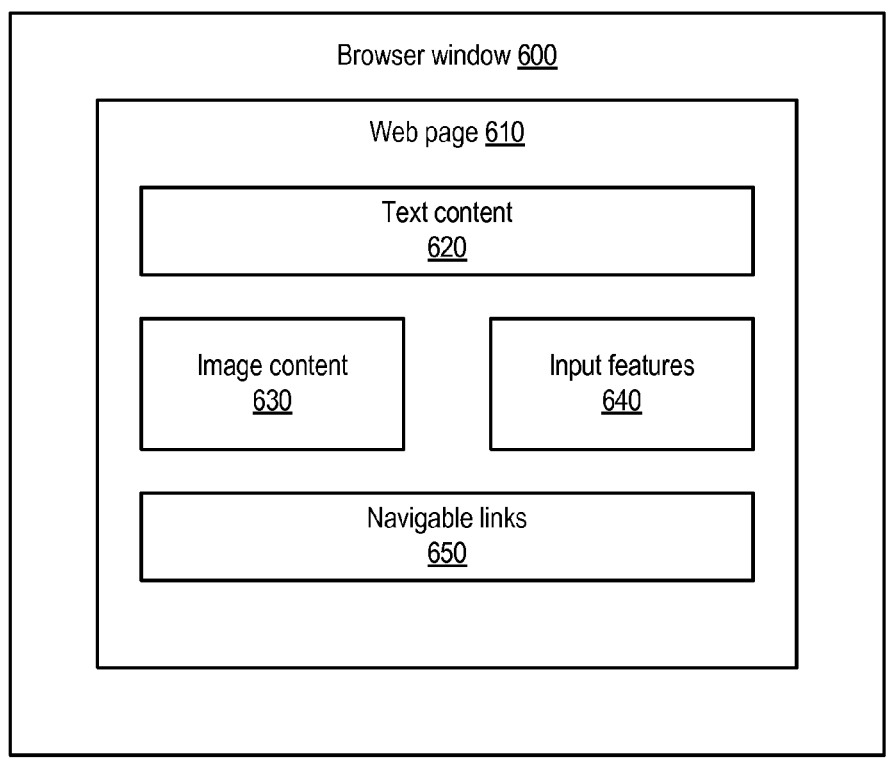
FIG. 6 illustrates one embodiment of a web page.

One embodiment of a generic web page is illustrated in FIG. 6. In the illustrated embodiment, a browser window 600 is shown to include web page 610. Among the various types of content included in web page 610 are text content 620, image content 630, input features 640 and navigable links 650, although in other embodiments web page 610 may include more or fewer types of content in various combinations, including types not specifically enumerated above. Although the various content types are illustrated as segregated features, they may be interspersed or combined in any suitable fashion according to the capabilities of the browser and language used to implement web page 610. In one embodiment, browser window 600 may be generated and managed by a web browser such as those mentioned above.

In one embodiment, the content and placement of various content features of web page 610 may be generated, for example by or on behalf of interface 200, to implement a web page through which a merchant 40 may invoke the self-service fulfillment services registration process described above with respect to FIG. 3. For example, text content 620, image content 630 and input features 640 may be configured to present a fulfillment service provider's request for input data to a merchant 40 and to provide a technique for allowing merchant 40 to enter and convey such data in response, such as through presenting a form with fields in which data may be inserted by the merchant 40.

In another embodiment, web page 610 may be configured to implement an e-commerce channel suitable for presenting offers in commerce of items 35 to customers 50, as well as other data potentially of interest to customers 50. For example, a merchant 40 may operate its own e-commerce hosting facilities, generating its own content and conveying it to customers 50 via web pages 610. Alternatively, a merchant 40 may arrange with another party, such as enterprise 5, to present such web pages 610 on its behalf. In another embodiment, enterprise 5 or another party may implement an e-commerce marketplace such as described above via one or more web pages 610. For example, a number of offers from various merchants 40 for a particular item 35, or for multiple items 35, may be displayed to a customer 50 via web page 610.

Integrating the Customer Experience Across Merchants Who Use Fulfillment Services In the foregoing discussion, various techniques to facilitate merchants' registration of their inventory items for fulfillment services were described, and examples of how customer orders for such inventory items might be fulfilled were described. As noted above, a merchant 40 that elects to obtain inventory fulfillment services from a third-party fulfiller such as enterprise 5 may be able to reduce the costs of managing, storing, and delivering inventory items to customers 50. For example, through aggregation of inventory from various merchants 40 and/or its own inventory, enterprise 5 may be able to leverage economies of scale that reduce per-unit fulfillment costs relative to what individual merchants 40 may achieve on a smaller scale. Also, by obtaining fulfillment services from a third-party provider, a merchant 40 may be able to offer customers 50 fulfillment services that might be less economical for the merchant 40 to provide on its own. For example, an enterprise 5 that performs a large volume of inventory fulfillment business may be able to negotiate more favorable shipping terms than an individual merchant 40, which may make it economically feasible for a merchant 40 to offer free, reduced-price or expedited shipping services to its customers 50. In some instances, by obtaining fulfillment services from an enterprise 5, a merchant 40 may be able to offer other value-added services to its customers 50, such as gift-wrapping services, print-on-demand services, item customization services, or other types of services that might be prohibitively expensive or inefficient for an individual merchant 40 to implement.

When a particular merchant 40 elects to obtain fulfillment services for some or all of items 35 from a fulfillment services provider such as enterprise 5, the particular merchant 40 may be able to reflect the benefits of such services in a manner that is relatively transparent to its customers 50. For example, customers 50 shopping with the particular merchant 40 need not be aware of its fulfillment relationship with enterprise 5. Such customers 50 may simply note that they are eligible to receive various services from the particular merchant 40, such as expedited, discounted or free shipping or other value-added services. In some cases, a customer's eligibility for various fulfillment services options, such as the shipping or value-added services mentioned, may depend upon the customer's relationship with the particular merchant 40. For example, the customer's eligibility may depend on the total value of items 35 or the specific types of items 35 ordered from the particular merchant 40 in a specific transaction, such that certain services become available to customers 50 dependent on their level of spending or the types of items 35 selected. In other cases, a customer's eligibility for various fulfillment services options may depend upon the customer's status, such as whether the customer 50 has a prior purchasing history with the particular merchant 40 or has paid for or otherwise earned the privilege of receiving preferential fulfillment services. For example, the particular merchant 40 may establish a loyalty program through which it may offer beneficial fulfillment services to repeat customers 50.

The situation may become more complex when a particular customer 50 engages in transactions with a number of different merchants 40, where multiple ones of the merchants 40 may obtain fulfillment services from an enterprise 5 for their respective items 35, for example as shown in the embodiment of FIG. 1. Even though merchants 40 may be distinct fiscal entities, they may share common fulfillment processes for at least some of their inventory, by virtue of their common use of fulfillment services offered by enterprise 5. If a particular customer's shopping activity across several merchants 40 can be consolidated or otherwise linked, it may be possible to present cost savings or special fulfillment features (such as the shipping-related features mentioned above) to a particular customer 50 even if that customer's order includes items 35 for which different merchants 40 are merchants of record.

For example, as described above, if a particular customer 50 shops from a single merchant 40 and places an order that satisfies a spending threshold, the particular customer 50 may be offered a fulfillment services feature relating to order shipping (e.g., reduced-cost or expedited shipping) or processing (e.g., expedited order processing, free or reduced-cost gift wrapping) that would not have been offered otherwise. In one embodiment, if a particular customer 50 who orders items 35 from a number of different merchants 40 who share common fulfillment services, the orders placed with respect to the multiple merchants 40 may be consolidated or aggregated for the purpose of offering fulfillment services features to the particular customer 50. For example, if a customer 50 orders items 35 from merchants 40a and 40b, each of which has arranged for the ordered items 35 to be fulfilled from fulfillment center 10, in one embodiment the total value of the customer's order from both merchants 40a-b may be used to determine the fulfillment services that the customer 50 is eligible to receive.

In some instances, such order aggregation or consolidation may enable merchants 40 to provide fulfillment services to customers 50 that might otherwise be economically infeasible. For example, viewed in isolation, a particular customer's order of items 35 from a single merchant 40 may be insufficiently profitable to justify providing extensive value-added fulfillment services or discounts to that customer. However, if the items 35 are part of the particular customer's larger transaction among several merchants 40, then the total value of the transaction, coupled with the economies of scale resulting from generating more fulfillment transactions through fulfillment center 10, may warrant passing savings along to customers 50 in the form of enhanced fulfillment options.

In the following discussion, several techniques for consolidating the fulfillment of items 35 ordered by a customer 50 from multiple different merchants 40 are described. In one embodiment, as mentioned previously, such consolidation may be implemented via a virtual shopping cart that allows the customer's shopping session to persist across the customer's interactions with several merchants 40, allowing the customer's various items 35 to be fulfilled concurrently from fulfillment center 10 (e.g., being shipped within a single package or shipment) while recording the transaction of each item 35 with respect to its corresponding merchant 40 as the merchant of record for that transaction. In another embodiment, a customer 50 may engage in separate ordering transactions with various merchants 40, but these transactions may be linked after the fact as part of a larger order. In some embodiments, the merchants 40 in the following discussion may have registered to obtain fulfillment services for their items 35 via a self-service registration interface such as interface 200 described above. However, it is noted that the use of self-service fulfillment services registration interface 200 is not a prerequisite for the techniques that follow, and that merchants 40 may arrange to obtain fulfillment services for items 35 via any suitable approach, whether highly automated or requiring considerable human intervention.

Figure 7:
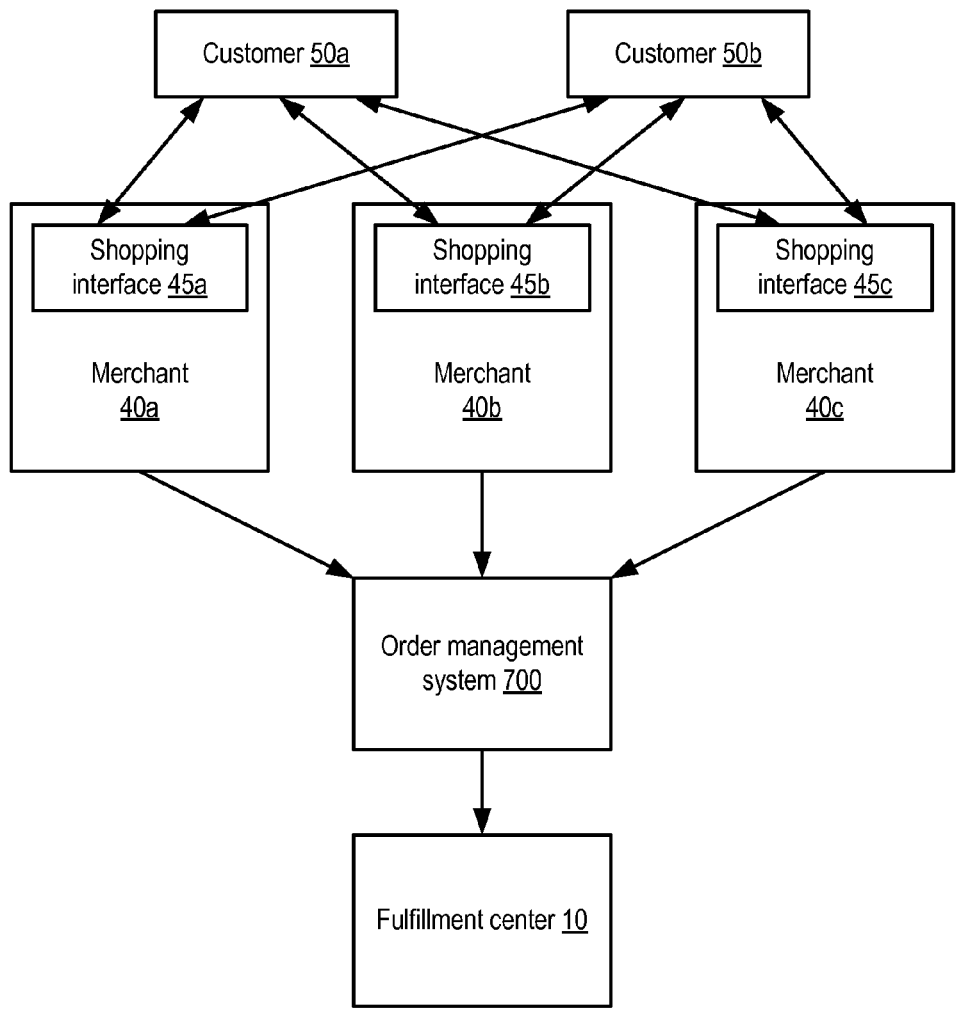
FIG. 7 is a block diagram illustrating one embodiment of an order management system.

FIG. 7 illustrates one embodiment of an order management system (OMS) 700. In one embodiment, as described below, OMS 700 may be configured to provide a virtual shopping cart interface on behalf of a number of merchants 40a-c, each of which has arranged to receive inventory fulfillment services for their items 35 from fulfillment center 10, though in other embodiments OMS 700 may provide order management services to merchants 40 without reliance on a virtual shopping cart interface. Generally speaking, order management system 700 may be implemented by one or more computer systems such as described below with respect to FIG. 10, and may be configured to perform any of the various functions associated with customer order intake and processing on behalf of fulfillment center 10 or enterprise 5. For example, OMS 700 may be configured to present web- or web-services-based interfaces (e.g., using HTTP or another suitable protocol or set of protocols) to merchants 40 and/or customers 50. Such interfaces may variously allow customers 50 to directly or indirectly (e.g., via merchants 40) specify the particular items 35 being ordered, shipping information, billing information, payment information, order handling instructions, and/or any other information relevant to the customer ordering process. Upon receiving an order for one or more items 35 by or on behalf of a particular customer 50, OMS 700 may be configured to validate the order (e.g., by checking the order data to make sure all required elements are present, checking to determine that the item(s) exist and are in stock, processing the customer's payment information, and/or any other tasks pertinent to order validation) and may convey the order to inventory management system 30 for fulfillment. It is noted that in some embodiments, order management system 700 and inventory management system 30 may be implemented as a single, integrated system, while in other embodiments, the functionality attributed to these systems may be partitioned in a different fashion.

As shown, merchants 40*a-c* may be configured to present respective shopping interfaces 45*a-c* to customers 50*a-b*. Generally speaking, a given shopping interface 45 may be configured to present information to customers 50 about items 35 that are offered by a corresponding merchant 40. For example, a given shopping interface 45 may utilize web- or web-services-based protocols (e.g., HTTP or other suitable protocol(s)) to convey text, images, audio, video, or any other suitable type of information regarding an item 35 to a customer 50 for display or presentation. Such information may be configured to present any suitable information that may be relevant to a customer's shopping experience. For example and without limitation, such information may describe or depict an item 35, indicate its cost, describe conditions or procedures for ordering the item 35, illustrate how item 35 is related to other items 35 that may be offered by a particular merchant 40, describe the feedback of other customers 50 regarding an item 35, and/or other matters pertaining to a customer's shopping experience. In some embodiments, shopping interface 45 may be interactive, in that the content or information it provides to a customer 50 may depend on input received from the customer. For example, shopping interface 45 may be configured to respond to information requests made by a customer 50, such as by selecting displayed links, radio buttons, menus, or other input techniques presented to the customer 50.

In some embodiments, shopping interface 45 may be configured to implement features in addition to conveying information regarding items 35 to customers 50. For example, shopping interface 45 may be configured to display information regarding merchant policies, to manage individual customer accounts and their associated credentials, to present an ordering and/or payment interface through which customers 50 may indicate their intention to order one or more items 35 from a merchant 40 and may supply payment and shipping details, or any other suitable customer-related functions.

In the illustrated embodiment, the shopping interfaces 45 presented to customers 50 by at least two different merchants 40 may be distinct from and independent of one another. For example, merchants 40*a-b* may present respective shopping interfaces 45*a-b* to a customer 50 where the implementation and/or operation of interface 45*a* does not depend in any way on that of interface 45*b*. In such an embodiment, merchants 40*a-b* may present shopping interfaces 45*a-b* that are configured for the respective needs or preferences of merchants 40*a-b*. For example, different merchants 40 may implement their respective shopping interfaces 45 to have different, customized features such as appearance (e.g., "look and feel"), branding, content, interactivity and/or customer feature support. By implementing distinct shopping interfaces 45, different merchants 40 may retain control over numerous customer-facing aspects of their business, even if several of the different merchants 40 receive order fulfillment services from a common fulfillment services provider, such as shown in FIG. 7.

It is noted that in embodiments where merchants 40 implement support for a virtual shopping cart as described below, their shopping interfaces 45 may still be distinct and independent from one another. That is, while various merchants 40 may rely on another entity such as a fulfillment services provider to provide virtual shopping cart functionality, their reliance on the other entity may be independent from how or whether other merchants 40 similarly rely on the other entity for virtual shopping cart or other services. For example, various ones of merchants 40 may reconfigure their respective shopping interfaces 45, may add or withdraw their support for a virtual shopping cart interface, or may initiate or terminate their relationship with a third-party fulfillment services provider without notice to, and without affecting the shopping interfaces 45 or other behavior of, other ones of merchants 40.

As an alternative to presenting to customers 50 a shopping interface 45 that is independent of the interfaces 45 of other merchants 40, a particular merchant 40 may share some or all aspects of its shopping interface 45 with another merchant 40. For example, the particular merchant 40 may utilize another merchant's descriptive content (e.g., descriptions or depictions of various items 35), interface framework (e.g., the placement and/or appearance of display features as presented to customers 50), and/or functional framework (e.g., the types and behavior of interactive or non-interactive functional features presented to customers 50) such that when the information or functionality relied upon changes, the changes are reflected by each of the merchants 40 that share the changed material.

In one embodiment, OMS 700 may be configured to provide a virtual shopping cart interface to the customers 50 who shop for various items 35 offered by merchants 40. Generally speaking, a virtual shopping cart may be configured to persistently store a record of the associations between a particular customer 50 and the items 35 that have been selected by that customer 50 for ordering, as well as the merchants 40 offering the selected items 35. In various embodiments, the selected items 35 may remain associated with the particular customer 50 via the virtual shopping cart for an indefinite period of time (e.g., until the particular customer 50 completes the ordering transaction or removes a selected item 35 from the cart), or the contents of the virtual cart may expire after a defined period of time (e.g., hours, days, weeks, etc.).

In one embodiment, the particular customer's virtual shopping cart may be associated with a user account maintained on behalf of the particular customer 50 by OMS 700. For example, the user account may be associated with unique credentials corresponding to the particular customer 50, such as a username or email address and a password, and may persistently store ordering details associated with the particular customer 50 such as shipping address information, credit card information, contact information or other customer-specific details. In another embodiment, the particular customer's virtual shopping cart may be transiently associated with the particular customer 50 via a session identifier or other impermanent identifier. In such an embodiment, the particular customer 50 may be required to input whatever ordering details are necessary to complete the ordering process, and if the session identifier expires before the ordering process is completed, the virtual shopping cart may be deleted or reset.

Merchants 40 may implement support for a virtual shopping cart interface provided by OMS 700 in any of a number of suitable ways. In one embodiment, a merchant 40 may associate customer-selectable "Add to cart" Uniform Resource Indicators (URIs) with each of the items 35 the merchant 40 offers to customers 50. Each of these URIs may refer to an interface maintained by OMS 700, and may be displayed to a customer 50 (e.g., via a web page 610) when the customer 50 is viewing other information associated with the corresponding item 35. When a customer 50 selects the URI corresponding to a given item 35 (e.g., by clicking on or otherwise selecting a link, button, or other input feature 640 displayed via web page 610, such as an "Add to cart" button), OMS 700 may responsively place the given item 35 in the customer's virtual shopping cart, e.g., by creating or updating a representation of the cart that reflects the customer's selection of the given item 35.

In one embodiment, when the customer 50 selects the given item's URI in order to place it in a virtual shopping cart, the customer 50 may navigate away from a web page hosted or maintained by the merchant 40 to a landing page presented by OMS 700. In one such embodiment, the customer 50 may be offered the opportunity to return to the merchant's site to continue shopping, to navigate to a different merchant 40, to complete the ordering process and check out, to manage the contents of the virtual shopping cart, or to perform other functions. In another embodiment, when the customer 50 selects the given item's "Add to cart" URI, OMS 700 may be configured to add the item to the customer's virtual shopping cart without the customer navigating away from the merchant 40 offering the given item 35.

Still other embodiments of techniques for placing a given item 35 in a virtual shopping cart are possible and contemplated. For example, rather than communicating the given item's selection to OMS 700 as soon as it is selected by a customer 50, a merchant 40 may queue or batch records of the selection of multiple items 35, either by a single customer 50 or by multiple customers 50. The merchant 40 may then convey these records to OMS 700 at a later time, for example when a customer 50 navigates away from the merchant's site or elects to finish the ordering process.

In another embodiment, instead of relying on client-server communications between OMS 700 and a customer's or merchant's system to manage the state of the virtual shopping cart (e.g., via HTTP requests or other types of interaction), a virtual shopping cart may be implemented as a client-side application or applet configured to execute on a system associated with customer 50. For example, functionality to detect a customer's selection of items 35 to be added to a virtual shopping cart and to manage the current state of the virtual shopping cart may be implemented as a Java™, Javascript or other type of application that may be executable within a browser environment executing on a computer system associated with the customer 50. In such an embodiment, management of the virtual shopping cart may occur primarily within the customer's system as the customer 50 navigates to various merchants 40. In one embodiment, the client-side virtual shopping cart may be configured to communicate with OMS 700 only after the customer 50 has elected to finalize an order based on the selections in the cart, though in other embodiments the client-side virtual shopping cart may communicate with OMS 700 or other entities as needed.

Figure 8:
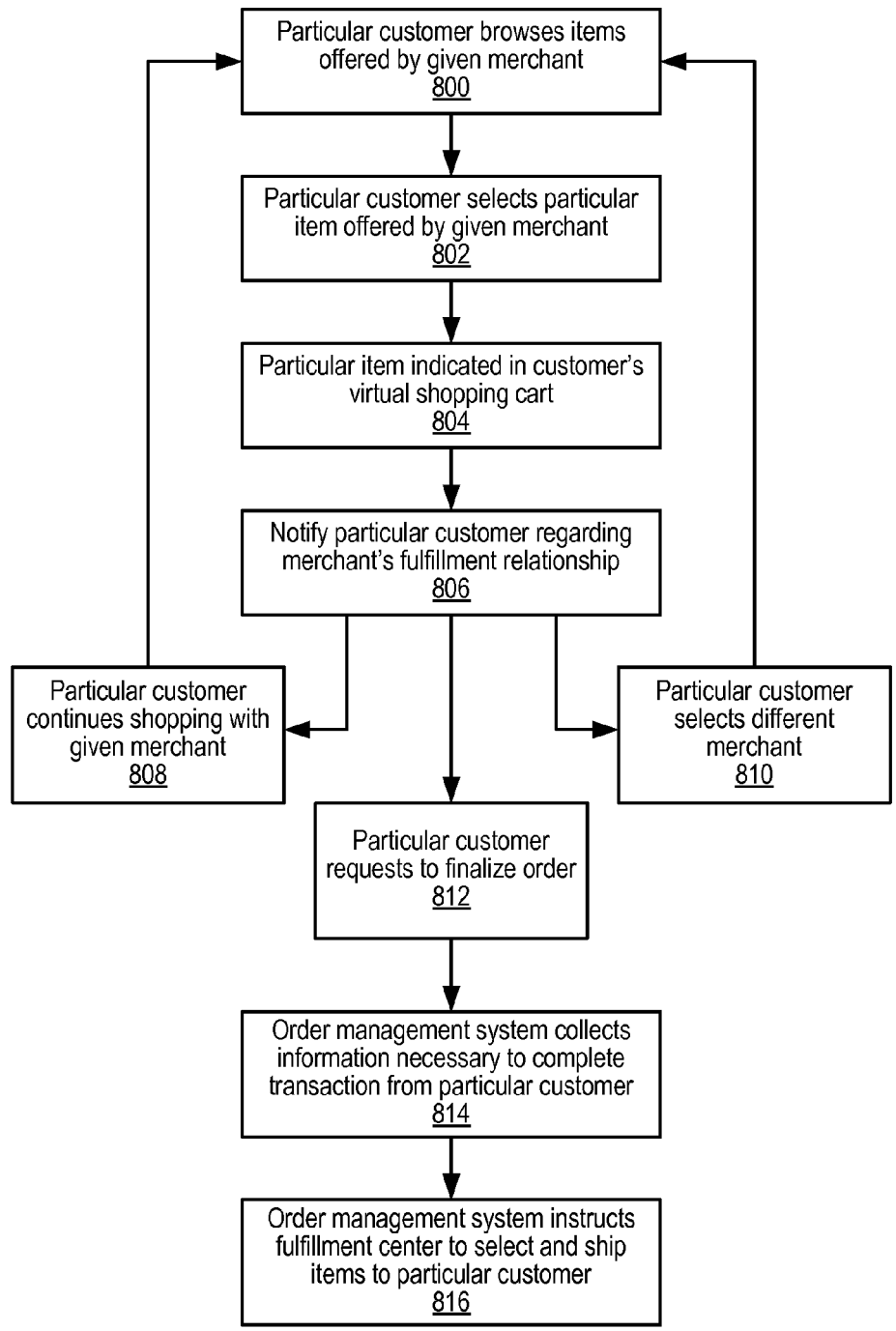
FIG. 8 is a flow diagram illustrating one embodiment of a customer ordering experience utilizing a virtual shopping cart.

FIG. 8 illustrates one embodiment of how a customer's shopping and ordering experience might proceed utilizing a virtual shopping cart managed by OMS 700. It is noted that to facilitate exposition, FIG. 8 depicts actions that may be taken by a customer 50 as well as actions that may be taken by merchants 40 and/or OMS 700. However, it is understood that OMS 700 may be configured to implement only a portion of the functionality shown in FIG. 8. For example, OMS 700 may be configured to respond to the activity of customers 50 that may be generated externally and conveyed to OMS 700 by or on behalf of those customers 50.

In block 800, a particular customer 50 may begin browsing the items 35 offered by a given merchant 40. For example, the particular customer 50 may visit a network-accessible description of the items 35 offered by given merchant 40 that may be presented as a web site, using web-based protocols, or as another type of interactive, network-accessible information source.

The particular customer 50 may select a particular item 35 offered by the given merchant 40 to be the subject of a transaction, such as a purchase, rental, or other suitable type of transaction (block 802). For example, the particular customer 50 may select an "Add to cart" button, hyperlink, or other type of input feature 640 displayed on a web page 610 that is associated with the particular item 35 and presented to the particular customer 50 by or on behalf of the given merchant 40.

In response to the particular customer's selection, the particular item 35 may be indicated within a virtual shopping cart corresponding to the particular customer 50 (block 804). For example, as mentioned above, selection of the particular item 35 may be conveyed to OMS 700, which may be configured to update a representation of the virtual shopping cart associated with the particular customer 50 to reflect the selection. In various embodiments, as noted above, the particular customer's selection may result in immediate navigation to a landing page hosted by OMS 700, or may result in the selection being communicated to OMS 700 without the particular customer 50 navigating away from the given merchant's display. In some embodiments, indication of the particular item 35 within the virtual shopping cart may be dependent upon the particular customer 50 authenticating himself or herself with respect to an existing user account maintained by OMS 700, for example by providing a user ID or email address and password to OMS 700.

The particular customer 50 may be notified regarding the given merchant's fulfillment relationship with enterprise 5 (block 806). While this is shown in FIG. 8 as occurring subsequent to selection of the particular item 35, such notification may also occur prior to selection of that or any other item 35. Such notification may convey different types of information depending on the fulfillment relationship that exists between the given merchant 40 and enterprise 5. For example, the particular customer 50 may be notified that the given merchant 40 has partnered with enterprise 5 to receive fulfillment services, and that the particular customer 50 may choose to place other items 35 in the virtual shopping cart for payment and fulfillment. These other items 35 may be offered by the given merchant 40, enterprise 5 or other merchants 40 that have registered to receive fulfillment services from enterprise 5.

In some embodiments, as part of notification of the given merchant's fulfillment relationship, the particular customer 50 may also be notified that items 35 placed in the virtual shopping cart and ordered together may be consolidated for the purpose of determining the fulfillment services available to the particular customer 50 for that order. For example, if the particular customer 50 is eligible for reduced-price, free, or expedited shipping from the given merchant 40, the particular customer 50 may be notified that such features may also apply to other items 35 offered by other merchants 40 that are placed in the virtual shopping cart. If a threshold requirement applies for certain fulfillment services, such as a minimum total value of the items 35 ordered, the particular customer 50 may be notified that the threshold will be evaluated based on the entire contents of the virtual shopping cart, even though various items 35 may have been selected from different merchants 40. In various embodiments, the value of items 35 may correspond to the price charged for the transaction, and may be inclusive or exclusive of discounts, surcharges, fees, taxes, or other accounting items that may apply depending on the merchant 40, the customer 50, and/or the item 35.

After selecting the particular item 35, the particular customer 50 may continue shopping with respect to items 35 presented by the given merchant 40 (block 808) or may select a different merchant 40 that also supports the virtual shopping cart managed by OMS 700 (block 810). In one embodiment, operation may then proceed from block 800. It is noted that in some embodiments, items 35 that were previously selected by the particular customer 50 may persist in the virtual shopping cart regardless of how the particular customer 50 navigates among the various merchants 40. For example, the particular customer 50 may navigate to a merchant 40 by clicking on a referral URI, manually entering a URI into a browser, selecting the merchant from a list of bookmarks or favorites, or using any other suitable technique. In one embodiment, the contents of the particular customer's virtual shopping cart may persist even if the particular customer 50 navigates away from the given merchant 40 to non-commerce site or a merchant that does not support the virtual shopping cart.

The particular customer 50 may instead elect to complete the shopping process and request that an order corresponding to the selected items 35 be finalized (block 812). For example, the particular customer 50 may select a "checkout" button or URI presented by the given merchant 40 or by OMS 700. In one embodiment, in response to the particular customer 50 indicating a request to finalize an order for fulfillment, OMS 700 may be configured to collect whatever information from the particular customer 50 is necessary to complete the shopping transaction (block 814).

Generally speaking, finalizing an order may encompass those actions defined by a merchant 40 or by OMS 700 to be prerequisite to completing the shopping transaction for items 35 that have been selected. In various embodiments, such actions may include verifying the particular customer's ability to pay and/or collecting payment, or collecting or verifying other types of customer information. For example, if the particular customer 50 has not previously supplied authentication information corresponding to an existing user account, OMS 700 may prompt the particular customer 50 for such information or to an establish an account. OMS 700 may also collect shipping, billing, and/or payment information from the particular customer 50, or may verify that information already on file should be used for the transaction. OMS 700 may also notify the particular customer 50 of savings or fulfillment features the customer is eligible to receive on the basis of the selected items 35. For example, if the particular customer 35 has satisfied a threshold to receive upgraded or discounted shipping, OMS 700 may notify the customer and/or display the value of the service as a discount or credit applied to the customer's order. It is noted that in various embodiments, a customer 50 may or may not be able to cancel an order once it has been finalized.

After collecting the information necessary to process the transaction, OMS 700 may notify the fulfillment center 10 to select and ship the ordered items 35 to the particular customer 50 (block 816). In one embodiment, the fulfillment process described above with respect to FIG. 4 may be employed. For example, the various items 35 ordered by the particular customer 50 may be retrieved from storage, packaged, and shipped, such that at least two different items 35 offered by two different merchants 40 are shipped in the same package to the particular customer 50. The different merchants 40 may be indicated as the merchants of record for their respective items 35, for example on a packing slip 500 as described above with respect to FIG. 5.

As just described, in some embodiments, a virtual shopping cart interface provided by OMS 700 may be configured such that customers 50 may consolidate or combine a number of different items 35 offered by different merchants 40 for fulfillment. By consolidating the fulfillment of such orders, it may be possible to pass along to customers 50 some of the economies of scale enjoyed by merchants 40 who elect to obtain fulfillment services for their items 35 from a high-volume fulfillment services provider such as enterprise 5. For example, such consolidation may enable merchants 40 to offer customers 50 reduced-cost or enhanced shipping services, or other value-added fulfillment services as mentioned previously. Such features may serve to increase the volume of business received by merchants 40, which may generate an increased volume of fulfillment transactions through fulfillment center 10. In turn, such increased volume may reduce the incremental cost of fulfilling a given item 35 or customer order, creating further cost savings in a "virtuous cycle" that may benefit enterprise 5, merchants 40 and/or customers 50.

In the foregoing discussion, items 35 from multiple merchants 40 may be identified as part of a particular customer's single order before the customer finalizes the order (e.g., by tendering payment). For example, the virtual shopping cart may function analogously to a real shopping cart, enabling the particular customer 50 to add or remove items 35 until the customer determines that shopping is complete, and then allowing the particular customer 50 to complete the ordering process for the multiple items 35 in the cart through a single payment or order completion transaction.

In an alternative embodiment, however, the consolidation of multiple items 35 from multiple merchants 40 may be performed after the customer 50 has completed an order transaction with only one (or fewer than all) of the merchants 40. It may be the case that certain merchants 40 may wish to register to receive fulfillment services from enterprise 5 for their inventory items 35, yet are unable to or do not wish to utilize a virtual shopping cart interface such as may be provided by OMS 700, as described above. For example, for technical or business reasons, a merchant 40 may wish to maintain its own order entry and payment functionality, rather than relying on a virtual shopping cart or other functionality presented by a third party.

Figure 9:
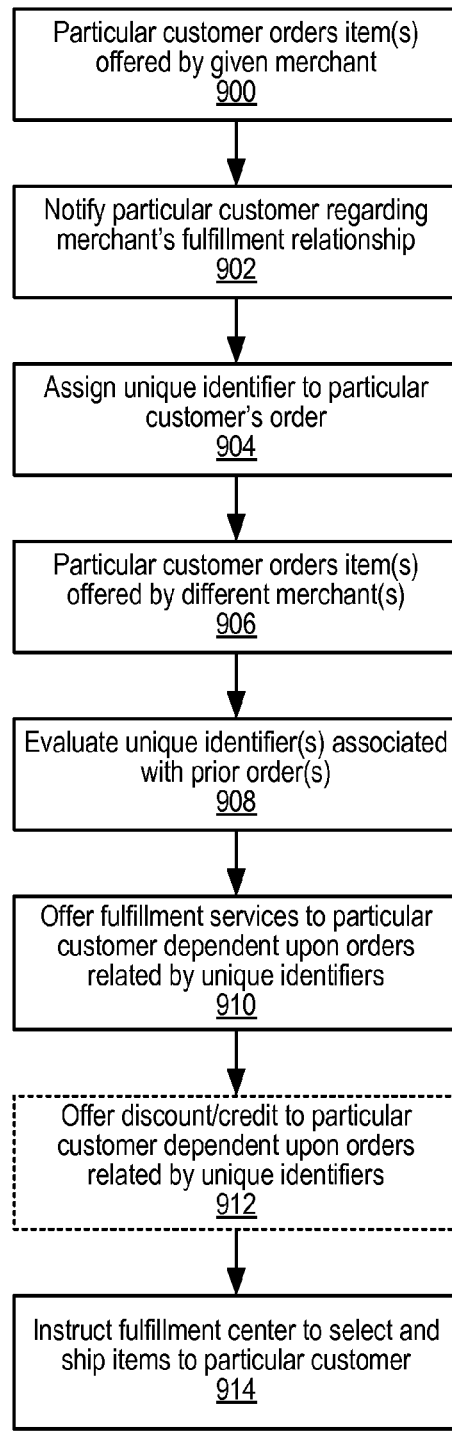
FIG. 9 is a flow diagram illustrating one embodiment of a customer ordering experience without reliance on a virtual shopping cart.

FIG. 9 illustrates one embodiment of how a customer's shopping and ordering experience might proceed with respect to various merchants 40 who have arranged to receive fulfillment services for at least some of their items 35 from a fulfillment services provider, and where the customer's ordering experience proceeds without reliance on a virtual shopping cart that persistently tracks the customer's item selections across various merchants 40. As with FIG. 8 discussed above, it is noted that to facilitate exposition, FIG. 9 depicts actions that may be taken by a customer 50 as well as actions that may be taken by merchants 40 and/or OMS 700. However, it is understood that OMS 700 may be configured to implement only a portion of the functionality shown in FIG. 9. For example, OMS 700 may be configured to respond to the activity of customers 50 that may be generated externally and conveyed to OMS 700 by or on behalf of those customers 50.

In block 900, a particular customer 50 may order one or more items 35 offered by a given merchant 40. For example, the particular customer 50 may visit a network-accessible description of the items 35 offered by given merchant 40 that may be presented as a web site, using web-based protocols, or as another type of interactive, network-accessible information source. The particular customer 50 may browse and select items 35 offered by the given merchant 40 according to any suitable interface presented by the given merchant 40. For example, in one embodiment, the given merchant 40 may present its own shopping cart interface that may be functionally similar to the virtual shopping cart described previously, except that the shopping cart may be specific to the given merchant 40 (that is, it may not allow the particular customer 50 to add items 35 other than those offered by the given merchant 40). Once the particular customer 50 has completed selecting items 35, he or she may complete the ordering transaction with respect to the selected items 35 via any suitable interface provided by the given merchant 40. For example, given merchant 40 may present its own order management interface configured to collect customer information, shipping information, payment information and/or other details needed to complete the order. Alternatively, given merchant 40 may arrange with one or more third parties to perform one or more of the tasks involved in finalizing customer orders. As noted above, the underlying transaction that is the subject of the customer's order with respect to items 35 may be any suitable type of transaction, such as a purchase, lease, rental or other type of transaction.

The particular customer 50 may be notified regarding the given merchant's fulfillment relationship with enterprise 5 (block 902). While this is shown in FIG. 9 as occurring subsequent to the particular customer's placement of an order, such notification may also occur prior to order placement. For example, notification may occur when the particular customer 50 begins browsing items 35 offered by the given merchant 40, when the particular customer 50 selects particular items 35 to order, or at any other suitable time(s). Such notification may convey different types of information depending on the fulfillment relationship that exists between the given merchant 40 and enterprise 5. For example, the particular customer 50 may be notified that the given merchant 40 has partnered with enterprise 5 to receive fulfillment services.

In some embodiments, as part of notification of the given merchant's fulfillment relationship, the particular customer 50 may also be notified that items 35 ordered from one or more different merchants 40 that have registered to receive fulfillment services from enterprise 5 may be consolidated for fulfillment. The particular customer 50 may also be notified that a subsequent order placed with the one or more different merchants 40 may be consolidated with the current order placed with the given merchant 40 for the purpose of determining the fulfillment services available to the particular customer 50 for the orders placed with the various merchants 40. For example, if the particular customer 50 is eligible for reduced-price, free, or expedited shipping from the given merchant 40, the particular customer 50 may be notified that such features may also apply to other items 35 offered by other merchants 40 that are subsequently ordered by the particular customer 50. If a threshold requirement applies for certain fulfillment services, such as a minimum total value of the items 35 ordered, the particular customer 50 may be notified the present order placed with the given merchant 40 may be combined with future orders placed with different merchants 40 for the purpose of determining whether the threshold has been satisfied.

It is noted that in some embodiments, notification to the particular customer 50 regarding the fulfillment relationship of given merchant 40 and/or other merchants 40 may be omitted. In some such embodiments, the various actions described below may occur without notice to the particular customer 50, or notice may be provided after the fact.

A unique identifier may then be assigned to the particular customer's order (block 904). (In some embodiments, assignment of the identifier may occur during completion of the order, described above with respect to block 900.) In one embodiment, the unique identifier may be configured to uniquely identify both the particular customer 50 and the order that the particular customer 50 has placed with the given merchant 40. In one embodiment, the unique identifier may be an alphanumeric token that may be displayed to the particular customer 50. In some such embodiments, the unique identifier may be presented to the particular customer 50 along with a notification that the customer may provide the token when placing an order with a different merchant 40 in order to obtain enhanced or reduced-cost fulfillment features. In another embodiment, the unique identifier may be implemented via a "cookie" that is persistently associated with the particular customer's web browser state. In some such embodiments, the reading and writing of such cookies by merchants 40 may be accomplished transparently with respect to the particular customer 50 (e.g., without requiring action on the particular customer's part). In still another embodiment, the unique identifier may be conveyed to OMS 700, which may be configured to manage the unique identifier on behalf of the particular customer 50. For example, OMS 700 may be configured to associate the unique identifier with the particular customer 50 via an existing account managed by OMS 700. Other embodiments employing other implementations of a unique identifier are possible and contemplated. It is contemplated that in some embodiments, the unique identifier may be configured to encode a number of distinct data items that may be separately parsed. For example, it may be possible to determine that different unique identifiers correspond to different orders placed by the same customer 50.

Subsequent to placing an order with the given merchant 40, the particular customer 50 may initiate an order one or more items 35 from one or more different merchants (block 906). For example, the particular customer 50 may navigate to a network-accessible description of items 35 offered by a different merchant 40 via a web site or other interface, and may place an order according to the procedures established by that merchant 40, which may be similar to or different from the ordering procedures used by given merchant 40. While this discussion may refer to orders placed with only two merchants 40 for simplicity, it is contemplated that any number of orders placed by the particular customer 50 may be related or consolidated using the techniques described.

The unique identifier(s) associated with the particular customer's prior order(s) may be evaluated (block 908). For example, in embodiments where the unique identifier is provided to the particular customer 50 as a token or string, the particular customer 50 may manually enter the unique identifier during or subsequent to completing the ordering process with respect to the one or more different merchants 40. In other embodiments, such as those involving browser cookies, a merchant 40 or OMS 700 may access the unique identifier without the particular customer's intervention.

In one embodiment, evaluation of the unique identifier may include determining whether the unique identifier is still valid. In one embodiment, a unique identifier corresponding to a prior order from the given merchant 40 may remain valid for a fixed period of time, such as a number of hours or days from when the prior order was completed. In another embodiment, the unique identifier of a prior order may remain valid until the prior order has begun or, alternatively, completed the fulfillment process (e.g., until picking of items 35 from storage commences, or until the order is shipped). In yet another embodiment, the unique identifier may remain valid indefinitely or until some other event occurs. In some embodiments, unique identifiers may be self-validating. For example, they may be encrypted or encoded in a manner that reflects the conditions under which they expire, such as by including a timestamp field. In other embodiments, the validity of unique identifiers may be checked and maintained by a third party, such as by OMS 700.

Fulfillment services may then be offered to the particular customer 50 dependent on the orders that are linked or related by the unique identifier(s) (block 910). In various embodiments, the particular customer 50 may be offered shipping options or other value-added fulfillment services dependent upon the presence of a valid unique identifier, dependent upon information about the prior order(s) encoded in the unique identifier, or dependent upon information about the prior order(s) obtained from a third party (e.g., OMS 700) dependent upon the unique identifier, where the features offered might not have been offered in the absence of the valid unique identifier.

For example, the particular customer 50 may be offered the opportunity to have the items 35 ordered from the different merchant(s) 40 shipped together with items 35 in the prior order from the given merchant 40. Alternatively, the particular customer 50 may be offered a fulfillment service or discount dependent upon whether the prior and current orders satisfy a threshold criterion, such as a total value or inclusion of a certain type of item 35. In this case, information about the prior order(s) may be obtained (either from decoding the unique identifier itself, or from accessing a record of the prior order(s) dependent upon the unique identifier) and evaluated with respect to the threshold criterion. For example, if the particular customer 50 is to receive free shipping dependent upon satisfying a minimum total order price, the value of the items 35 from the current and prior orders may be totaled in evaluating whether the requirement has been satisfied.

Optionally, the particular customer 50 may be offered a discount or credit dependent on the orders that are linked or related by the unique identifier(s) (block 912). For example, in an embodiment where the availability of various fulfillment services depends on whether the customer's order satisfies a threshold criterion, it may be the case that the particular customer's prior order with the given merchant 40 did not satisfy the threshold (e.g., the total order value was below the threshold). As a result, the particular customer 50 may have paid a surcharge or failed to receive a discount that would have been available had the threshold been satisfied. However, when the particular customer's orders among various merchants 40 are considered together, including prior and subsequent orders related by a valid unique identifier, the threshold may be satisfied.

This situation may be handled in a number of different ways in various embodiments. For example, suppose the particular customer 50 was charged a shipping fee by the given merchant 40 because the items 35 ordered from the given merchant 40 did not satisfy a threshold to receive free shipping. Shortly thereafter, suppose the particular customer 50 places an additional order with another merchant 40, supplying a valid unique identifier that relates the later order with the prior order, where the combination of items 35 ordered from both merchants 40 satisfies the free shipping threshold. In one embodiment, the second merchant 40 may offer a discount for the entire shipping fee previously paid by the particular customer 50. The second merchant 40 may then recoup a portion of the discount from the given merchant 40. Alternatively, the second merchant 40 may offer the particular customer 50 a prorated discount for a portion of the previously paid shipping fee, and may instruct the given merchant 40 to award a similar discount retroactively, or may instruct the particular customer 50 to return to the given merchant 40 to obtain a retroactive discount. In still another embodiment, instead of discounts or credits against current or prior orders, the particular customer 50 may be offered credits against future orders. It is contemplated that any suitable combination of retroactive, current or future discounts or credits, including none at all, may be offered to the particular customer 50 by any suitable combination of merchants 40, including merchants 40 who are not necessarily parties to a current transaction with the particular customer 50.

It is also contemplated that in some embodiments, the task of identifying opportunities for customer discounts or credits based on multiple orders may be performed by a third party in combination with or instead of merchants 40 themselves. For example, in one embodiment, merchants 40 may take orders customers 50 and submit the orders to a third party system such as OMS 700. OMS 700 may be configured to analyze the submitted orders to identify orders from different merchants 40 that were placed by the same customer 50. For example, OMS 700 may analyze the orders on the basis of a unique identifier (e.g., a user ID and password combination supplied by the customer 50 when placing each of the orders, or another suitable type of unique identifier as described above), the billing or shipping address supplied with the orders, or other suitable factors. In response to identifying orders multiple orders of a customer 50 that can be consolidated for fulfillment or are otherwise eligible for enhanced fulfillment services or discounts when considered in the aggregate, OMS 700 may be configured to perform such consolidation or award the services or discounts either in conjunction with merchants 40 or without requiring activity on the merchants' part. In some embodiments, OMS 700 may be configured to notify the customer 50 of his or her eligibility for consolidated order fulfillment, additional fulfillment services or discounts, and may request the customer's authorization to perform or award some or all of these. In other embodiments, OMS 700 may be configured to consolidate orders or award enhanced services or discounts without the customer's consent.

After two or more orders placed by the particular customer 50 have been identified as linked or related dependent upon unique identifier(s), fulfillment center 10 may be instructed to select and ship the ordered items 35 to the particular customer 50 (block 914). For example, after taking the particular customer's orders, various merchants 40 may be configured to convey the orders to OMS 700 or directly to fulfillment center 10 (e.g., to inventory management system 30) for fulfillment. In one embodiment, the fulfillment process described above with respect to FIG. 4 may be employed. For example, the various items 35 ordered by the particular customer 50 may be retrieved from storage, packaged, and shipped, such that at least two different items 35 offered by two different merchants 40 are shipped in the same package to the particular customer 50. The different merchants 40 may be indicated as the merchants of record for their respective items 35, for example on a packing slip 500 as described above with respect to FIG. 5.

Exemplary Computer System Embodiment

It is contemplated that in some embodiments, any of the methods or techniques described above may be implemented as program instructions and data capable of being stored or conveyed via a computer-accessible medium. Such methods or techniques may include, for example and without limitation, the functions of inventory management system 30, interface 200, database 210, and/or order management system 700, as well as the methods illustrated in FIG. 3, 4, 8, or 9 or any suitable variations or portions thereof. Such program instructions may also be executed to perform computational functions in support of the methods and techniques described above, for example to instantiate operating system functionality, application functionality, and/or any other suitable functions.

Figure 10:
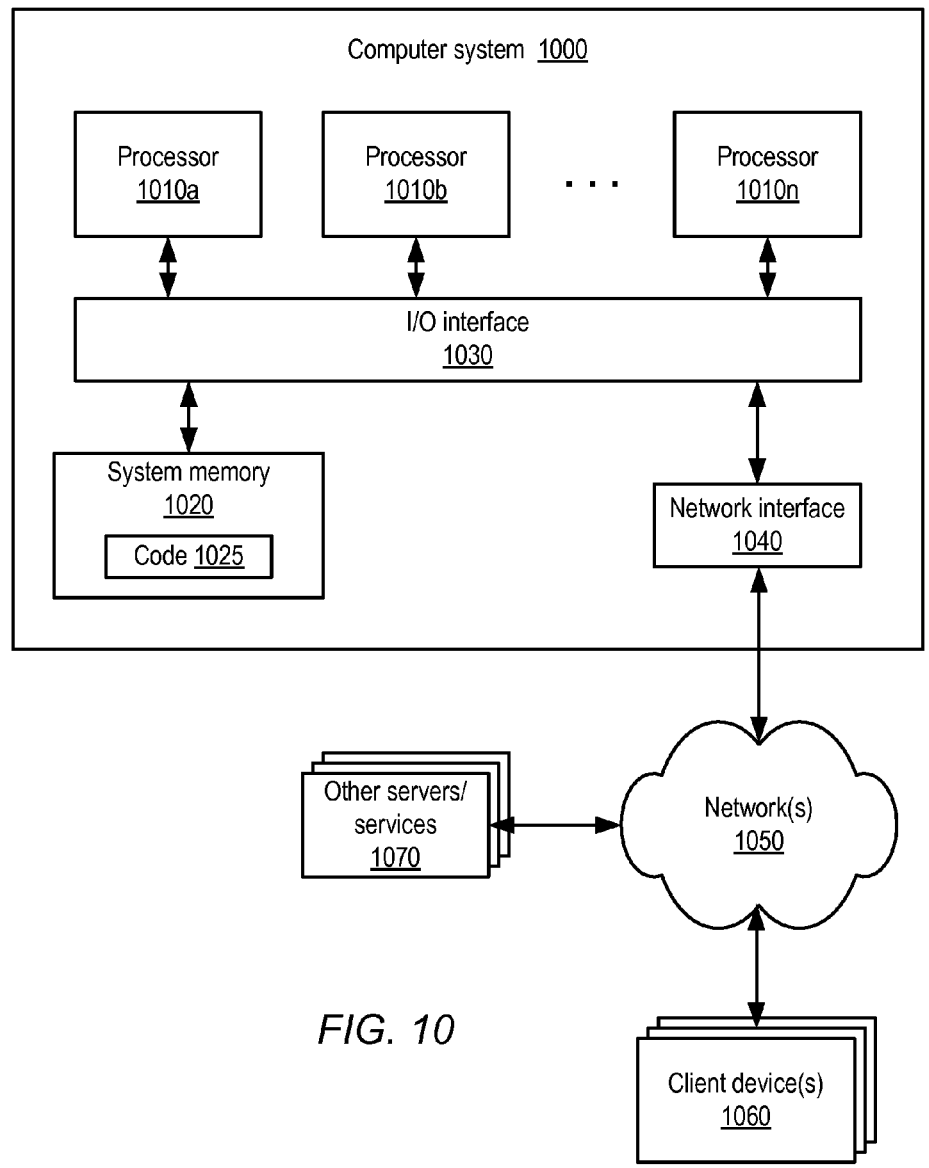
FIG. 10 is a block diagram illustrating an exemplary embodiment of a computer system.

One exemplary embodiment of a computer system including computer-accessible media is illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. In some embodiments, it is contemplated that inventory management system 30 or order management system 700 may collectively or individually be implemented using a single instance of computer system 1000, while in other embodiments multiple such systems may be configured to host different portions or instances of inventory management system 30 or order management system 700. For example, in one embodiment some data sources or services (e.g., purchasing management services) may be implemented via instances of computer system 1000 that are distinct from those instances implementing other data sources or services (e.g., order entry/fulfillment services). It is noted that in some embodiments, the functions of inventory management system 30 or order management system 700 as variously described hereinabove may be implemented as part of a single software or software/hardware system, or may be partitioned in any suitable fashion into a number of distinct modules, procedures or other functional portions. The resulting portions of inventory management system 30 and/or order management system 700 may then be implemented as a unified or distributed system among one or several instances of computer system 1000, for example as instructions executable by one or more of processors 1010.

In various embodiments computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be a general-purpose or embedded processor implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by process 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 1020 as code 1025.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network 1050, such as other computer systems or communications devices, for example. In particular, network interface 1040 may be configured to allow communication between computer system 1000 and client devices 1060 and/or other servers/services 1070 through various communications channels via network(s) 1050. These client devices 1060 may include various computing and communications devices, which may include elements similar to those of computer system 1000. In particular, client devices 1060 may include devices associated with various ones of customers 50, such as personal computers, telephony devices or other network-attached computing devices customers 50 may employ to access network services, such as the e-commerce services offered by merchants 40 and/or enterprise 5, for example. The communications channels may include, but are not limited to conventional and mobile telephone and text messaging communications channels. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media, e.g., disk or CD/DVD-ROM coupled to computer system 1000 via I/O interface 1030. A computer-accessible medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

Additionally, it is contemplated that any of the methods or techniques (or suitable portions thereof) described above and illustrated, for example, in FIG. 3, 4, 8, or 9 may be implemented as a web service that may be performed on behalf of clients requesting such a service. Generally speaking, providing a function or service as a web service may encompass providing any of a variety of standardized APIs configured to allow different software programs to communicate (e.g., to request services and respond to such requests) in an autonomous, web-based and typically platform-independent manner. For example, an enterprise may choose to expose certain enterprise data (e.g., catalog data, inventory data, customer data or other types of data) and/or certain enterprise functions (e.g., fulfillment service request processing functions, query functions, electronic commerce functions, generic data storage or computational functions, etc.) to external clients (e.g., merchants 40 or customers 50) via a web services interface. Applications could then access the exposed data and/or functions via the web services interface, even though the accessing application may be configured to execute on an entirely different platform (e.g., a different operating system or system architecture) than the platform hosting the exposed data or functions. For example, a merchant 40 may perform self-service registration of an item 35 for fulfillment services, or may inform fulfillment center 10 of an order to be fulfilled, through web services calls exposed by interface 200.

In some embodiments, provisioning a web service may encompass the use of particular protocols which may be executable (e.g., as part of code 1025) to publish available web services to potential users, to describe the interfaces of web services sufficiently to allow users to invoke web services properly, to allow users to select and differentiate among web services for a particular transaction, and to provide a format for exchanging web services data in a flexible and platform-independent manner. Specifically, in one embodiment a provider of a web service may register the service using a version of the Universal Discovery Description and Integration (UDDI) protocol, which may function as a general directory through which potential resource users may locate web services of interest. The web service provider may also publish specific details regarding how a well-formed web services request from a user should be formatted (e.g., what specific parameters are required or allowed, the data type or format to be used for a given parameter, etc.). For example, such interface details may be published (e.g., within a UDDI directory entry) using a version of the Web Services Description Language (WSDL).

In many embodiments, web services request and response data is exchanged between a client and the service provider through the use of messages or documents formatted as platform-independent structured data, such as a document formatted in compliance with a version of eXtensible Markup Language (XML). For example, in one embodiment a web services request to provide inventory health information for a given inventory item may be embodied in an XML document including fields identifying the item of interest, the type of data requested (e.g., inventory health data), and possibly other fields, in which each field is delimited by an XML tag describing the type of data the field represents. The response to such a request from the web service provider may include an XML document containing the requested data. In some embodiments, web services-related documents may be transmitted between applications making requests and targeted web services using a web-based data transfer protocol, such as a version of the Hypertext Transfer Protocol (HTTP), for example.

Different types of web services requests and responses may yield XML documents that bear little content in common, which may complicate the handling and interpretation of such documents. For example, in different versions of a free-form XML document specifying a web services request, the actual web service that is requested may appear at different places within different document versions, which may require a recipient of the document to buffer or parse a good deal of document data before understanding what the document is for. Consequently, in some embodiments, the XML documents containing web services request/response data may encapsulated within additional XML data used to define a messaging framework, e.g., a generic format for exchanging documents or messages having arbitrary content. For example, in one embodiment web services requests or responses may be XML documents formatted according to a version of the Simple Object Access Protocol (SOAP), which in various versions may define distinct document sections such as an "envelope" (e.g., which may include a specification of the document type, the intended recipient web service, etc.) as well as a message body that may include arbitrary XML message data (e.g., the particular details of the web services request). However, in some embodiments, web services may be implemented using different protocols and standards for publishing services and formatting and exchanging messages.

Additionally, in some embodiments, a web services system may be implemented without using document-based techniques such as SOAP-type protocols. For example, as an alternative to a document-based approach, a web service may be implemented using a Representational State Transfer (REST)-type architecture. Generally speaking, in REST-type architectures, web services requests may be formed as commands conveyed via a transport protocol, such as PUT or GET commands conveyed via a version of the HTTP protocol. Those parameters of the request that might be embedded within a document in a document-based web services architecture may instead be included as command parameters in a REST-type architecture. Other suitable configurations of web services architectures are possible and contemplated.

It is noted that the order in which actions are taken in the above description (e.g., with respect to discussions of flow charts) is merely exemplary, and that in alternative embodiments, the actions described may be performed in any suitable order. Also, it is contemplated that in other embodiments, certain actions may be added or other actions omitted.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
a memory configured to store instructions; and
one or more processors coupled to said memory;
wherein said instructions are executable by at least one of said one or more processors to implement an order management system;
wherein said order management system is configured to implement a virtual shopping cart interface configured for use with each of a plurality of merchants, wherein each given one of said plurality of merchants is registered to receive inventory fulfillment services provided by a fulfillment services provider for inventory items offered in commerce by said given merchant, wherein the fulfillment services provider is distinct from said plurality of merchants, wherein the inventory fulfillment services include shipping the inventory items to customers, and wherein at least two of said plurality of merchants are configured to present their own independent respective shopping interfaces, which each support the virtual shopping cart interface, to said customers;
wherein said virtual shopping cart interface is configured to receive requests on behalf of a given one of said customers to indicate two or more of said inventory items respectively offered by two or more different ones of said merchants within a virtual shopping cart managed by said virtual shopping cart interface, wherein said virtual shopping cart corresponds to said given customer; and wherein, in response to receiving a request to finalize an order on behalf of said given customer, said order management system is configured to instruct said fulfillment services provider to ship said two or more inventory items to said given customer in one or more shipments, wherein at least one of said one or more shipments comprises inventory items offered by said two or more different merchants, and wherein each of said two or more different merchants is a merchant of record for its respective offered inventory item.

2. The system as recited in claim 1, wherein said order management system is further configured to determine said given customer's eligibility for a particular fulfillment service dependent upon said two or more of said inventory items indicated within said virtual shopping cart corresponding to said given customer.

3. The system as recited in claim 2, wherein to determine said given customer's eligibility for said particular fulfillment service, said order management system is further configured to determine whether a total value of said two or more of said inventory items indicated within said virtual shopping cart exceeds a threshold value.

4. The system as recited in claim 2, wherein said particular fulfillment service comprises reduced-cost or free shipping.

5. The system as recited in claim 2, wherein said particular fulfillment service comprises expedited shipping.

6. The system as recited in claim 2, wherein said particular fulfillment service comprises a fulfillment service other than shipping.

7. The system as recited in claim 2, wherein said order management system is further configured to notify said given customer of said given customer's eligibility for said particular fulfillment service.

8. The system as recited in claim 7, wherein said order management system is further configured to apply said particular fulfillment service to said order dependent upon said given customer's approval.

9. The system as recited in claim 1, wherein after being indicated within said virtual shopping cart, a given one of said inventory items remains indicated within said virtual shopping cart until said given customer requests that said given inventory item be removed.

10. The system as recited in claim 1, wherein after being indicated within said virtual shopping cart, a given one of said inventory items remains indicated within said virtual shopping cart until a given period of time has elapsed since said given inventory item was indicated within said virtual shopping cart.

11. The system as recited in claim 1, wherein to implement said virtual shopping cart interface, said order management system is further configured to present one or more Uniform Resource Indicators (URIs) to each of said plurality of merchants.

12. The system as recited in claim 11, wherein to receive a given one of said requests on behalf of said given customer to indicate a given inventory item within said virtual shopping cart, said virtual shopping cart interface is further configured to detect that said given customer has selected one of said URIs corresponding to said given inventory item.

13. The system as recited in claim 1, wherein to implement said virtual shopping cart interface, said order management system is further configured to present a client-executable virtual shopping cart application executable within a browser environment executable on a computer system associated with said given customer.

14. The system as recited in claim 13, wherein to receive a given one of said requests on behalf of said given customer to indicate a given inventory item within said virtual shopping cart, said client-executable virtual shopping cart application is configured to detect that said given customer has selected said given inventory item.

15. The system as recited in claim 1, wherein said instructions are further executable by at least one of said one or more processors to implement an inventory management system, wherein said inventory management system is configured to:
    implement a registration interface;
    receive, from a given one of said merchants via said registration interface, a registration request to receive inventory fulfillment services from said fulfillment services provider for a given one of said inventory items;
    determine whether said registration request is valid; and
    in response to determining that said registration request is valid, provide to said given merchant via said registration interface information for conveying units of said inventory item to said fulfillment services provider.

16. A computer-implemented method, comprising:
    performing, by one or more computers:
        an order management system presenting a virtual shopping cart interface to each of a plurality of merchants, wherein each given one of said plurality of merchants is registered to receive inventory fulfillment services provided by a fulfillment services provider for inventory items offered in commerce by said given merchant, wherein the fulfillment services provider is distinct from said plurality of merchants, wherein the inventory fulfillment services include shipping the inventory items to customers, and wherein at least two of said plurality of merchants are configured to present their own independent respective shopping interfaces, which each support the virtual shopping cart interface, to said customers;
        said virtual shopping cart interface receiving requests on behalf of a given one of said customers to indicate two or more of said inventory items respectively offered by two or more different ones of said merchants within a virtual shopping cart managed by said virtual shopping cart interface, wherein said virtual shopping cart corresponds to said given customer; and
        in response to receiving a request to finalize an order on behalf of said given customer, said order management system instructing said fulfillment services provider to ship said two or more inventory items to said given customer in one or more shipments, wherein at least one of said one or more shipments comprises inventory items offered by said two or more different merchants, and wherein each of said two or more different merchants is a merchant of record for its respective offered inventory item.

17. The method as recited in claim 16, further comprising said order management system determining said given customer's eligibility for a particular fulfillment service dependent upon said two or more of said inventory items indicated within said virtual shopping cart corresponding to said given customer.

18. The method as recited in claim 17, wherein determining said given customer's eligibility for said particular fulfillment service comprises said order management system determining whether a total value of said two or more of said inventory items indicated within said virtual shopping cart exceeds a threshold value.

19. The method as recited in claim 17, wherein said particular fulfillment service comprises reduced-cost or free shipping.

20. The method as recited in claim 17, wherein said particular fulfillment service comprises expedited shipping.

21. The method as recited in claim 17, wherein said particular fulfillment service comprises a fulfillment service other than shipping.

22. The method as recited in claim 17, further comprising said order management system notifying said given customer of said given customer's eligibility for said particular fulfillment service.

23. The method as recited in claim 22, further comprising said order management system applying said particular fulfillment service to said order dependent upon said given customer's approval.

24. The method as recited in claim 16, wherein after being indicated within said virtual shopping cart, a given one of said inventory items remains indicated within said virtual shopping cart until said given customer requests that said given inventory item be removed.

25. The method as recited in claim 16, wherein after being indicated within said virtual shopping cart, a given one of said inventory items remains indicated within said virtual shopping cart until a given period of time has elapsed since said given inventory item was indicated within said virtual shopping cart.

26. The method as recited in claim 16, wherein presenting said virtual shopping cart interface to said merchants comprises said order management system presenting one or more Uniform Resource Indicators (URIs) to each of said plurality of merchants.

27. The method as recited in claim 26, wherein receiving a given one of said requests on behalf of said given customer to indicate a given inventory item within said virtual shopping cart comprises said virtual shopping cart interface detecting that said given customer has selected one of said URIs corresponding to said given inventory item.

28. The method as recited in claim 16, further comprising said order management system presenting a client-executable virtual shopping cart application executable within a browser environment executable on a computer system associated with said given customer.

29. The method as recited in claim 28, wherein receiving a given one of said requests on behalf of said given customer to indicate a given inventory item within said virtual shopping cart comprises said client-executable virtual shopping cart application detecting that said given customer has selected said given inventory item.

30. The method as recited in claim 16, further comprising:
an inventory management system implementing a registration interface;
said inventory management system receiving, from a given one of said merchants via said registration interface, a registration request to receive inventory fulfillment services from said fulfillment services provider for a given one of said inventory items;
said inventory management system determining whether said registration request is valid; and
in response to determining that said registration request is valid, said inventory management system providing to said given merchant via said registration interface information for conveying units of said inventory item to said fulfillment services provider.

\* \* \* \* \*